US012525910B2

(12) United States Patent
Moses

(10) Patent No.: US 12,525,910 B2
(45) Date of Patent: Jan. 13, 2026

(54) ELECTRIC MOTOR AND ELECTRIC GENERATOR

(71) Applicant: Donald Moses, St-Côme (CA)

(72) Inventor: Donald Moses, St-Côme (CA)

( * ) Notice: Subject to any disclaimer, the term of this patent is extended or adjusted under 35 U.S.C. 154(b) by 164 days.

(21) Appl. No.: 18/393,136

(22) Filed: Dec. 21, 2023

(65) Prior Publication Data

US 2025/0211155 A1 Jun. 26, 2025

(51) Int. Cl.
*H02P 25/18* (2006.01)

(52) U.S. Cl.
CPC ................... *H02P 25/184* (2013.01)

(58) Field of Classification Search
CPC .. H02P 25/184; H02P 1/32; H02P 1/24; H02P 1/26; H02P 1/42; H02P 1/46; H02P 3/14; H02P 6/08; H02P 6/14; H02P 7/29; H02P 9/007; H02P 25/03; H02P 25/062; H02P 25/064; H02P 25/107; H02P 27/06; H02P 27/08; H02P 2207/05
USPC ................................ 310/12.21, 12.24, 49.32
See application file for complete search history.

(56) References Cited

U.S. PATENT DOCUMENTS 6,791,226 B1 * 9/2004 Dhawan .................. H02P 25/18
310/179

* cited by examiner

*Primary Examiner* — Antony M Paul

(57) ABSTRACT

A DC electric motor including both coils in a delta configuration and coils in a wye configuration. When pulses are fed to selected ones of the coils to power the electric motor, both coils from the delta configuration and coils from the wye configuration are fed with the DC pulse. In some embodiments, a similar electric generator is provided.

19 Claims, 15 Drawing Sheets

ELECTRIC MOTOR AND ELECTRIC GENERATOR

FIELD OF THE INVENTION

The present invention relates to the general field of motors and generators, and is more particularly concerned with an electric motor and an electric generator.

BACKGROUND

Powerful electric motors are often powered using alternating current, for example triphasic alternating current. In some applications, such as in electric and hybrid vehicles, this alternating current is provided by an inverter connected to batteries. There is some loss of power in the inverter. In addition, the need for a auxiliary glycol cooling pump is often used to successfully cool the inverter.

Also, in these motors, the polarity of coils powered by the alternating current changes as a function of the position of the motor's rotor. Therefore, during each rotation of the rotor, each coil is powered with a first polarity, which creates a magnetic field having a first orientation, followed by reversal of the polarity, and therefore of the magnetic field. To reverse the orientation of the magnetic field, the magnetic field must first be reduced to zero before being increased with the opposite orientation. The energy stored in the magnetic field must therefore be removed from the coil each time the orientation of the magnetic field is reversed. Part of this energy may be recovered in some motors, but there are many parasitic losses that decrease the efficiency of the motor.

In addition, standard triphasic motor are not always optimized according to the force provided by Lorentz's Law as they provide a force over a relatively large angular displacement. Furthermore, in the standard triphasic motors, there is no dead time between different phases of the system, which causes magnetic hysteresis to cause further energy losses, and continuously cause parasitic heat generation. The types of inefficiencies mentioned above result in a decrease in the range of a vehicle powered by the electric motor when compared to an ideal system. Furthermore, similar problems can be present in generators, with cause (electric power provided) and effect (inefficiencies due to the manner in which the magnetic fields in the coil are managed) reversed.

Yet furthermore, electric motors are typically wired in either a wye configuration or a delta configuration. Each of these configurations has some disadvantages due to their different non-linear behaviors. Also, in each of these configurations, a limited number of coils is active at any given time, limiting the torque provided by the motor.

Thus, there is a need on the market for an improved electric generator. An object of the present invention is therefore to provides such an electric generator.

SUMMARY OF THE INVENTION

In a broad aspect, there is provided an electric motor, comprising: a rotor including a permanent magnet, the rotor defining a north pole and an opposed south pole; a stator including a plurality of coils disposed circumferentially therearound, the plurality of coils including delta coils connected to each other in a delta configuration defining three edges and three vertices, and wye coils connected to each other in a wye configuration defining three branches each defining opposed proximal and distal ends, the proximal ends being substantially equipotentially electrically linked to each other, the coils within each edge being angularly superposed with each other and with the coils of a respective one of the branches at a common orientation along the stator; a pair of power input terminals for receiving direct current (DC) electrical power; a capacitor; and a plurality of switches selectively openable and closable so that each coil is operable between a power mode and a recovery mode, wherein, in the power mode, the coil is electrically coupled to the power input terminals, the capacitor, or both the power input terminals and the capacitor to allow transfer of electric power to the coil from the power input terminals, the capacitor or both the power input terminals and the capacitor, and, in the recovery mode, the coil is electrically coupled to the capacitor to allow transfer of energy stored in the coil to the capacitor; wherein in each of the powered and recovery modes, the coils from one of the edges and the coils of two of the branches are activated simultaneously.

There may also be provided an electric motor wherein in each of the powered and recovery modes, the coils from one of the edges are connected in series with the coils of two of the branches so that the delta and wye configurations are both simultaneous active.

There may also be provided an electric motor wherein each coil from the plurality of coils is electrically connected in series to another one of the coils from the plurality coils located diametrically opposed thereto on the stator and wound such that forces exerted on the north and south poles by the two coils are similar to each other.

There may also be provided an electric motor wherein each coil is further operable in a passive mode wherein the coil is in an open circuit with both the capacitor and the power input terminals such that there is no transfer of energy into or out of the coil.

There may also be provided an electric motor wherein, in the power mode, the coil is electrically coupled to both the power input terminals and the capacitor in parallel.

There may also be provided an electric motor wherein the edges of the delta configuration have substantially similar edge inductances, and the branches of the wye configuration have substantially similar branch inductances.

There may also be provided an electric motor wherein the edge inductances are about twice the branch inductances.

There may also be provided an electric motor wherein the edges of the delta configuration are operated with three electrical delta phases offset by about 120 degrees relative to each other, the branches of the wye configuration are operated with three wye phases offset by about 120 degrees relative to each other, and the delta and wye phases are as a group offset by about 30 degrees relative to each other.

There may also be provided an electric motor further comprising a position sensor for sensing a relative position between the rotor and the stator.

There may also be provided an electric motor further comprising a speed sensor for sensing a relative rotation speed between the rotor and the stator.

There may also be provided an electric motor wherein the switches from the plurality of switches are electronic switches, the electric motor further comprising a controller for selectively individually opening and closing the electronic switches.

There may also be provided an electric motor wherein the controller is operative for modulating a duration of energy pulses provided to the coils during the power phase as a function of an external load applied to the electric motor.

There may also be provided an electric motor wherein each coil is further operable in a passive mode wherein the coil is in an open circuit with both the capacitor and the power input terminals such that there is no transfer of energy into or out of the coil; the controller includes an encoder jointly rotatable with the rotor and defining a plurality of windows extending therethrough, at least one light source and a plurality of light sensors provided with the encoder therebetween, wherein the at least one light source, light sensors and encoder are positioned such that light from the at least one light source reaches each of the light sensors only when one of the windows is in register therewith; and a logic circuit for selectively closing and opening the plurality of switches, the logic circuit being operatively coupled to the light sensors for receiving illumination information from each light sensor indicative of whether the light reaches the sensor or not; and the plurality of windows encodes in a binary code an open or closed status that each switch from the plurality of switches is required to have at each angular position of the rotor to switch the coils between the powered, recovery and passive modes, the logic circuit being operative for decoding the code and selectively controlling opening and closing each of the switches so that the coils exert a torque rotating the motor when in the power mode and recovery of magnetic energy stored in the coils is possible in the recovery mode.

There may also be provided an electric motor wherein the encoder includes a disk through which the windows extend.

There may also be provided an electric motor wherein the windows are substantially arcuate and centered on a rotation axis of the encoder.

There may also be provided an electric motor further comprising a battery between the power input terminals.

There may also be provided an electric motor wherein the electric motor is also operable as a generator in which the plurality of switches are selectively openable and closable so that each given coil is operable in a generator power mode and in a generator recovery mode, wherein in the generator power mode, the given coil is in series in a power circuit between the power output terminals to allow creation of a voltage between the power output terminals due to an induced electromotive force created by an increase of magnetic flux in the given coil caused by rotation of the rotor; and in the generator recovery mode, the given coil is in series in a recovery circuit distinct from the power circuit between the power output terminals to recover between the output terminal at least part of energy stored in the coil during operation in the power mode.

There may also be provided an electric motor wherein the generator recovery circuit includes a rectifying circuit for preserving a polarity of the power output terminals so that DC power of a predetermined polarity is provided to the power output terminals by the recovery circuit.

In yet another broad aspect, there is provided an electric motor, comprising: a rotor including a permanent magnet; a stator including a plurality of coils disposed circumferentially therearound, the plurality of coils including delta coils connected to each other in a delta configuration and wye coils connected to each other in a wye configuration; wherein the delta and wye coils are jointly operated using pulsed direct current so that some of the delta and some of the wye coils are fed simultaneously with the pulsed direct current.

There may also be provided an electric motor wherein the delta configuration defines three edges and three vertices, and the wye configuration defines three branches each defining opposed proximal and distal ends, the proximal ends being substantially equipotentially electrically linked to each other, the coils within each edge being angularly superposed with each other and with the coils of a respective one of the branches at a common orientation along the stator, and wherein the delta and wye coils are jointly operated using the pulsed direct current so that some of the delta and some of the wye coils are in series with each other during each pulse of the pulsed direct current.

Other objects, advantages and features of the present invention will become more apparent upon reading of the following non-restrictive description of some embodiments thereof, given by way of example only with reference to the accompanying drawings.

DETAILED DESCRIPTION

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention.

The present documents describes many motors, generators and combined motors/generators. Generally speaking, the proposed motor uses DC current to power coils using brief pulses of current and includes energy storage components, such as capacitors, to recover at least part of the energy stored in the magnetic field of the coils when the later are unpowered during some phases of the motor operation. This recovered energy can then be used to power the coils in subsequent phases of motor operation.

Figure 1:
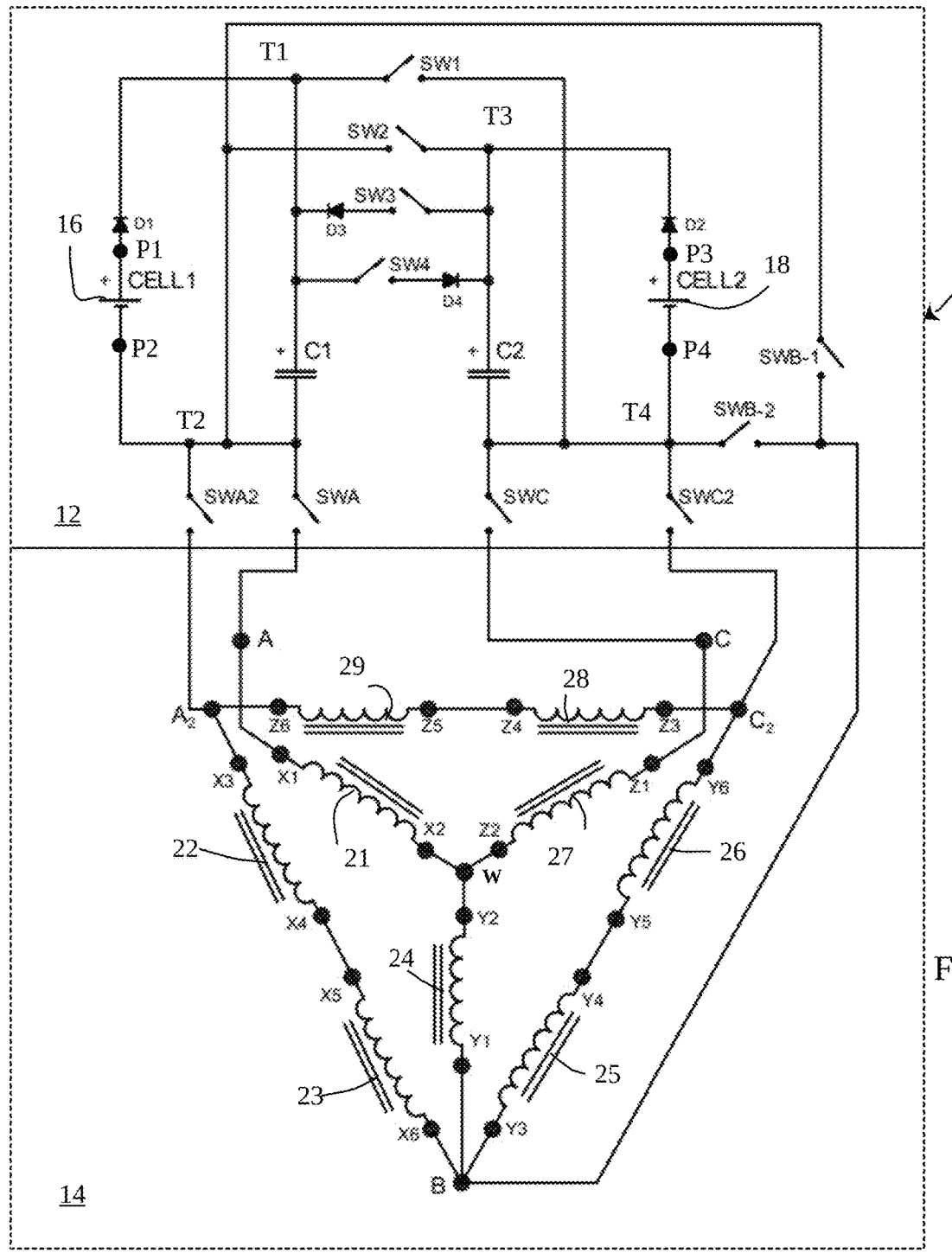
FIG. 1, in a schematic view, illustrates the electric circuit of an electric motor in accordance with an embodiment of the present invention.

FIG. 1 illustrates schematically the electric circuit representing the proposed electric motor 10. The motor 10 includes a power module 12 and a motor module 14. The power module 12 include the various components required to selectively provide current to the motor module 14 and recover at least part of the magnetic energy stored in the motor module 14 when delivery of electrical power thereto is interrupted. The motor module 14 includes components that will be switched on and off during operation of the motor 10 to provide a motive force to a rotor, as further described below. The power module 12 is powered by first and second batteries 16 and 18, although a single battery or more than two batteries could be used in alternative embodiments. If a single battery is used, there may be a need to use an isolation stage to prevent unwanted flow of energy within the motor 10. The first and second batteries 16 and 18 include for example a plurality of lithium-ion cells, or any other types of battery cells usable to provide direct current.

The first battery 16 is connected at the anode to a first power input terminal P1 and at the cathode to a second power input terminal P2. Similarly, the second battery 18 is connected at the anode to a third power input terminal P3 and at the cathode to a fourth power input terminal P4. While the first and second batteries 16 and 18 are shown as part of the power module 12 in FIG. 1, in some embodiments, the first and second batteries are remote from the power module 12 and not part thereof.

The motor module 14 has five input nodes A, $A_2$, B, C and $C_2$. Tension can be provided between selected pairs of the five input nodes A, $A_2$, B, C, and $C_2$ by the power module 12. The motor module 14 also includes nine coil equivalents 21 to 29. A coil equivalent 21 to 29 includes one or more coils provided in series with each other and used to generate a magnetic field in the motor 10 to provide motive force. A coil equivalent 21 to 29 therefore behaves like an inductance with a relatively small resistance in the motor module 14. In a typical embodiment, the coils are part of the stator of a motor 10 and used to rotate a rotor including for example permanent magnets, as further described below. The coil equivalents 21 to 29 all have substantially similar inductance. This is convenient as similar coils can then be used in the physical implementation of the electric motor 10. However, some of the coil equivalents 21 to 29 that are in series to each other could be replaced by a single coil equivalent having a different inductance, as detailed below. Furthermore, In some embodiments, the resistance of the coil equivalents 21, 24 and 27 is smaller by about 33% than that of coil equivalents 22, 23, 25, 25, 28 and 29, for example by using a larger wire in the corresponding coils, so as to be able to achieve similar peak currents in the wye and delta configurations of the motor, and also be able to recover same level of energy on wye and delta configuration while the motor is running. With this adjustment, the resistive value of the line-line impedance of the three phases in wye is identical to the resistive value of the line-line impedance of the three phases in delta Each coil equivalent 21 to 29 extends between two nodes according to the configuration set forth in Table 1.

TABLE 1

Position of the coil equivalents 21 to 29 relative to the nodes X1 to Z6 in FIG. 1

| Coil equivalent | First node | Second node |
|---|---|---|
| 21 | X1 | X2 |
| 22 | X3 | X4 |
| 23 | X5 | X6 |
| 24 | Y1 | Y2 |
| 25 | Y3 | Y4 |
| 26 | Y5 | Y6 |
| 27 | Z1 | Z2 |
| 28 | Z3 | Z4 |
| 29 | Z5 | Z5 |

Coil equivalents 21, 24 and 27 are provided in a wye configuration. To that effect, nodes X2, Y2 and Z2 are all electrically connected to a central node W. Electrically connected nodes have substantially identical electrical potentials, with extremely minor potential drops due to the resistance of the wires interconnecting the nodes. Also, Nodes X1, Y1 and Z1 are electrically connected respectively to nodes A, B and C. Therefore, coil equivalents 21, 24 and 27 form branches of the wye configuration.

Coil equivalents 22, 23, 25, 26, 28 and 29 are provided in a delta configuration. More specifically, the delta configuration includes 3 edges including respectively coil equivalents 22 and 23, coil equivalents 25 and 26, and coil equivalents 28 and 29. Nodes $A_2$, B and $C_2$ form the vertices of the delta configuration. To that effect, Nodes Z4 and Z5, Y4 and Y5, and X4 and X5 are pairwise electrically connected to each other, while the pairs of nodes Z6 and X3, Z3 and Y6, and X6 and Y3 are respectively electrically connected to nodes $A_2$, $C_2$ and B. Therefore, a distal end of one of the branches of the wye configuration shares node B with one of the vertices of the delta configuration.

The power module 12 includes four terminals T1, T2, T3 and T4, two capacitors $C_1$ and $C_2$, four diodes D1, D2, D3 and D4, and ten switches SW1, SW2, SW3, SW4, SWA, SWA2, SWB-1, SWB-2, SWC and SWC2. The reader skilled in the art will understand the exact number and configuration of these components may vary according to the exact embodiment of the invention without departing from the scope of the claims. The switches SW1, SW2, SW3, SW4, SWA, SWA2, SWB-1, SWB-2, SWC and SWC2 are typically high speed electronic power switches allowing to rapidly switch between open and closed states and to carry in the closed state relatively large currents. The capacitors C1 and C2 could be individual physical capacitors, or banks of such physical capacitors, or supercapacitors. The capacitors C1 and C2 can be charged and discharged relatively rapidly under relatively large tensions to receive and release electric energy in the form of charges stored on metal components separated from each other by a dielectric material. This is to be contrasted to batteries, which use electrochemical reactions to store energy. The diodes D1 to D4 are used to only allow unidirectional flow of current between some components, as described below.

Terminals T1 and T2 are electrically connected respectively to power input terminals P1 and P2, with diode D1 between the first power terminal P1 and the terminal T1 to prevent current to flow back to the first battery 16 from the first terminal T1. Similarly, terminals T3 and T4 are electrically connected respectively to power input terminals P3 and P4, with diode D2 between the first power input terminal P3 and the terminal T3 to prevent current to flow back to the second battery 18 from the power terminal T3.

The capacitors C1 and C2 are respectively connected to power terminals T1 and T3 at their anode and to power terminals T2 an T4 at their cathode. Therefore, the capacitors C1 and C2 are in parallel respectively with the first and second batteries 16 and 18. One function of the diodes D1 and D2 is therefore to prevent discharge of the capacitors C1 and C2 into the first and second batteries 16 and 18 when they are under a tension larger than the tension of the first and second batteries 16 and 18.

Switches SW1, SW2, SW3 and SW4 control the flow of current within the power module 12, while switches SWA, SWA2, SWB-1, SWB-2, SWC and SWC2 control the flow of current between the power module 12 and respectively nodes A, $A_2$, B, B, C and $C_2$. One can note that two switches, SWB-1 and SWB-2 control connection of the power module 12 to the node B. The other switches SWA, SWA2, SWC and SWC2 each control connection between the power module 12 and a single one of the nodes A, $A_2$, C and $C_2$. Switches SWA, SWA2 and SWB-1 extend between the terminal T2 and respectively nodes A, $A_2$ and B. Switches SWC, SWC2 and SWB-2 extend between the terminal T4 and respectively nodes C, $C_2$ and B. Switch SW1 extends between terminals T1 and T4, switch SW2 extends between terminals T2 and T3, and switches SW3 and SW4 both extend between terminals T1 and T3. Diodes D3 and D4 are in series with respectively switches SW3 and SW4 to prevent flow of current respectively from terminal T1 to terminal T3 and vice-versa through the switches SW3 and SW4.

Figure 2:
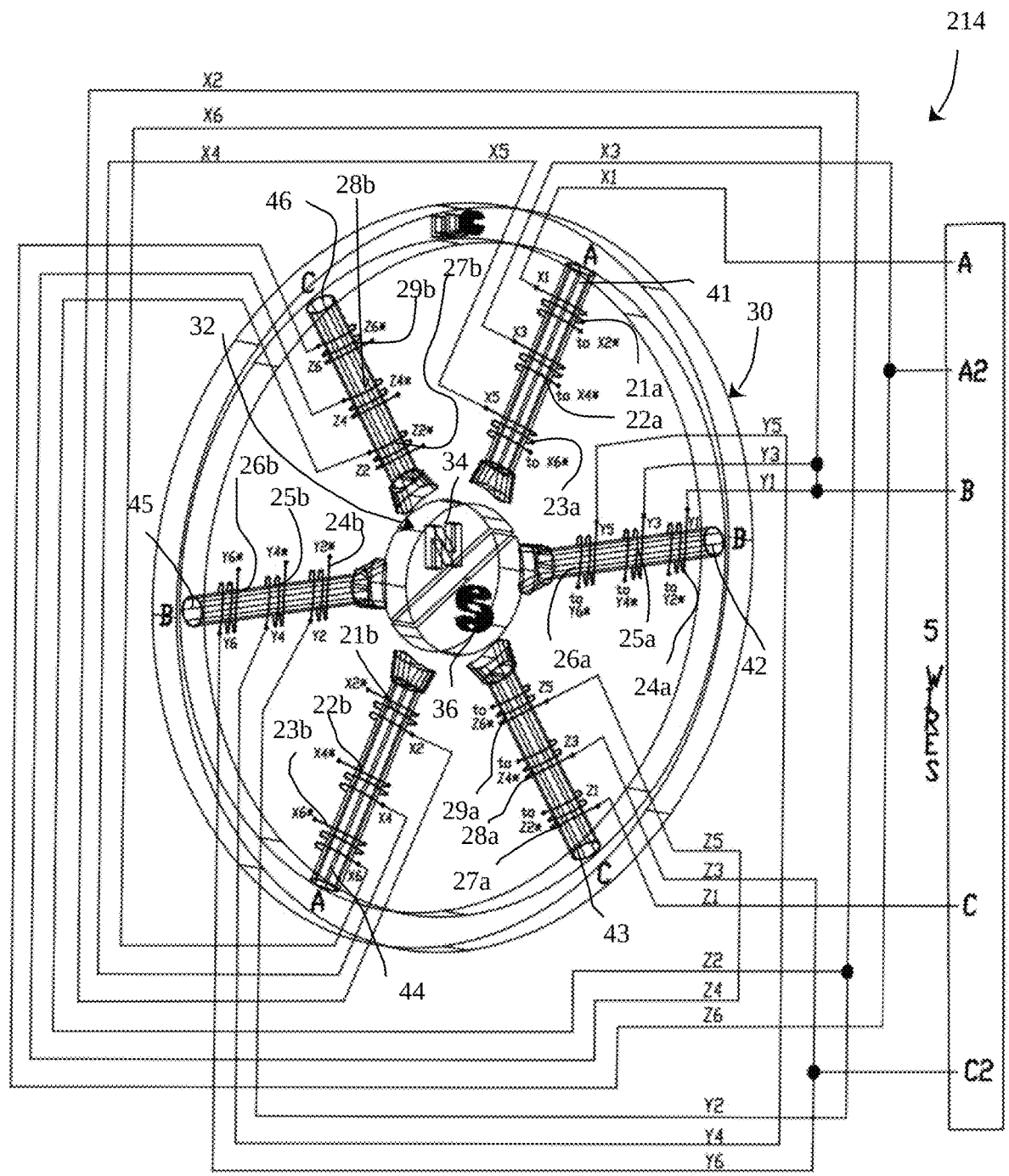
FIG. 2, in a schematic view, illustrates the wiring of one configuration example of the electric motor of FIG. 1.

FIG. 2 illustrates the physical configuration of the motor module 14. The motor module 14 includes a stator 30 and a rotor 32. The rotor 32 is mounted so as to be rotatable about the stator 30, and typically includes an output shaft (not shown in the drawings) to provide rotational power from rotation of the rotor 32. The rotor 32 shown in the drawings is bipolar and includes one or more permanent magnets defining opposed north and south poles 34 and 36. However, in alternative embodiments, the rotor 32 includes more than two pole pairs, and therefore may define more than one north pole 34, and more than one south pole 36. Also, the rotor 32 may include electromagnets or superconducting electromagnets.

The stator 30 includes 6 poles 41 to 46 forming 3 pole pairs. Poles 41 and 44 are paired, poles 42 and 45 are paired, and poles 43 and 46 are paired. The poles 41 and 46 within each pair are diametrically opposed to each other on the stator 30 and produce magnetic fields of opposite polarities, as the rotor 32 is bipolar. Each pole pair corresponds to three coil equivalents 21 to 29. Each coil equivalent 21 to 29 includes respectively two coils 21a and 21b to 29a and 29b, located on opposite poles. Coil equivalents 21, 22 and 23 are wound on pole 41 and 44, coil equivalents 24, 25 and 26 are wound on poles 42 and 45, and coil equivalent 27, 28 and 29 are wound on poles 43 and 46. While the coils 21a to 29b shown in FIG. 2 are shown spaced apart from each other, the coils 21a to 29b are typically intertwined or wound adjacent or on top of each other, such that the coils 21a to 29b provided at each pole 41 to 46 provides a similar magnetic attraction to the rotor 32.

A specific example of correspondence between FIGS. 1 and 2 is now given, with the understanding that similar relationships exist for the other coils 21a to 29b and coil equivalents 21 to 29. Coil equivalent 21 includes coils 21a and 21b. Coils 21a starts at node X1 and ends at node "to X2*", which is connected to node X2* through a wire, not shown in FIG. 2 for clarity reason. Coil 21b starts at node X2* and finishes at node X2. Coils 21a and 21b are therefore in series, and are wound so that when a current of given polarity circulates within coils 21a and 21b, the magnetic fields produced within coils 21a and 21b will have an opposed radial orientation when viewed relative to the rotor 32. In other words, while the magnetic dipoles creates by coils 21a and 21b are aligned in the same direction in space, they exert similar forces on the rotor 32 as the coils 21a and 21b are on opposite sides of the stator 30.

It should be noted that while coil equivalents 21, 22 and 23 are on the same physical pair of poles 41 and 44 in the stator 30, they will not all be in phase during operation of the electric motor 10. Indeed, the three sides of the delta configuration are operated typically 120 degrees out of phase relative to each other. Also, the three branches of the wye configuration are operated also 120 degrees out of phase relative to each other. However, the wye and delta configurations are not in phase, but instead 30 degrees out of phase relative to each other. This phase shift is the reason for the fact that the inductance of each side of the delta configuration is double the inductance of each branch of the wye configuration. The motor 10 is can therefore be considered a 6 phase motor, even if only three pole 41 to 46 pairs are provided in the stator 30.

Figure 4:
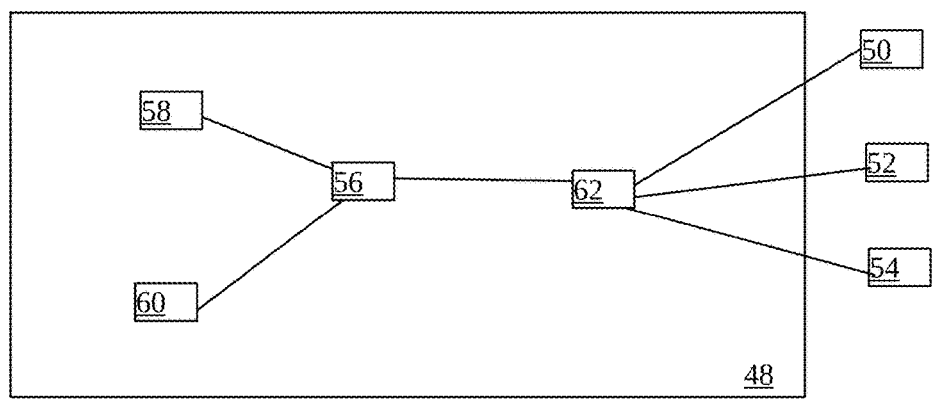
FIG. 4, in a schematic view, illustrates a controller usable to control the electric motor of FIG. 1, along with components connected thereto.

Referring to FIG. 4, the electric motor 10 is controlled by a controller 48. The controller 48 is operatively connected to switches SW1, SW2, SW3, SW4, SWA, SWA2, SWB-1, SWB-2, SWC and SWC2, represented collectively by the reference numeral 50 in FIG. 4, to selectively open and close selected ones of the switches SW1, SW2, SW3, SW4, SWA, SWA2, SWB-1, SWB-2, SWC and SWC2 at different stages of operation of the motor 10. The controller 48 is for example a microcontroller. The electric motor 10 is also typically provided with a position sensor 52 for sensing a position of the rotor 32 relative to the stator 30 and feeding this information to the controller 48 to time the powering and shutting down the coils 21a to 29b. In some embodiments, the position sensor 52 is also used to sense a rotation speed of the rotor 32 relative to the stator 30. However, in alternative embodiments, the rotation speed is detected using a dedicated speed sensor 54.

The controller 48 includes a processor 56 and memory 58 (e.g., random-access memory, read-only memory, flash memory). The controller 48 may also include in some embodiments an electronic storage unit 60 (e.g., hard disk or solid state drive, among others) and communication interface 62 (e.g., network adapter) for communicating with one or more other systems. The communication interface 62 is also operable to obtain data from the position and speed sensors 52 and 54 and to close and open the switches 50. In some embodiments, the controller 48 also includes peripheral devices, such as cache, other memory, data storage and/or electronic display adapters, among others.

The memory 58, storage unit 60, interface 62 and peripheral devices, when present, are in communication with the processor 56 through a communication bus (solid lines). The storage unit 60 can be a data storage unit (or data repository) for storing data and/or programs. The controller 48 can in some embodiments be operatively coupled to a computer network ("network") (not shown in the drawings) with the aid of the communication interface 62. The network can be the Internet, an internet and/or extranet, or an intranet and/or extranet that is in communication with the Internet. In some embodiments, the network is part of a network interconnecting components in a vehicle, such as an automobile network, for example selected from a Controller Area Network (CAN), Automotive Ethernet (AE) or FlexRay.

The processor 56 can execute a sequence of machine-readable instructions, which can be embodied in a program or software. The instructions may be stored in a memory location, such as the memory 58. The instructions can be directed to the processor 56, which can subsequently program or otherwise configure the processor 56 to implement methods of operating the electric motor 10 the present disclosure. Examples of operations performed by the processor 56 can include fetch, decode, execute, and writeback. The processor 56 can be part of a circuit, such as an integrated circuit.

Control of the motor 10 is effected through executable code stored on an electronic storage location of the controller 48, such as, for example, in the memory 58 or electronic storage unit 60. The machine executable or machine readable code can be provided in the form of software. During use, the code can be executed by the processor 56. In some cases, the code can be retrieved from the storage unit 60 and stored on the memory 58 for ready access by the processor 56. In some situations, the electronic storage unit 60 can be precluded, and machine-executable instructions are stored in memory 58.

The code can be pre-compiled, or can be compiled during runtime. The code can be supplied in a programming language that can be selected to enable the code to execute in a pre-compiled or as-compiled fashion. The code may provide a user interface allowing commands to be entered, and a control module controlling the dedicated interface, for example in the form of a device driver.

Figure 3:
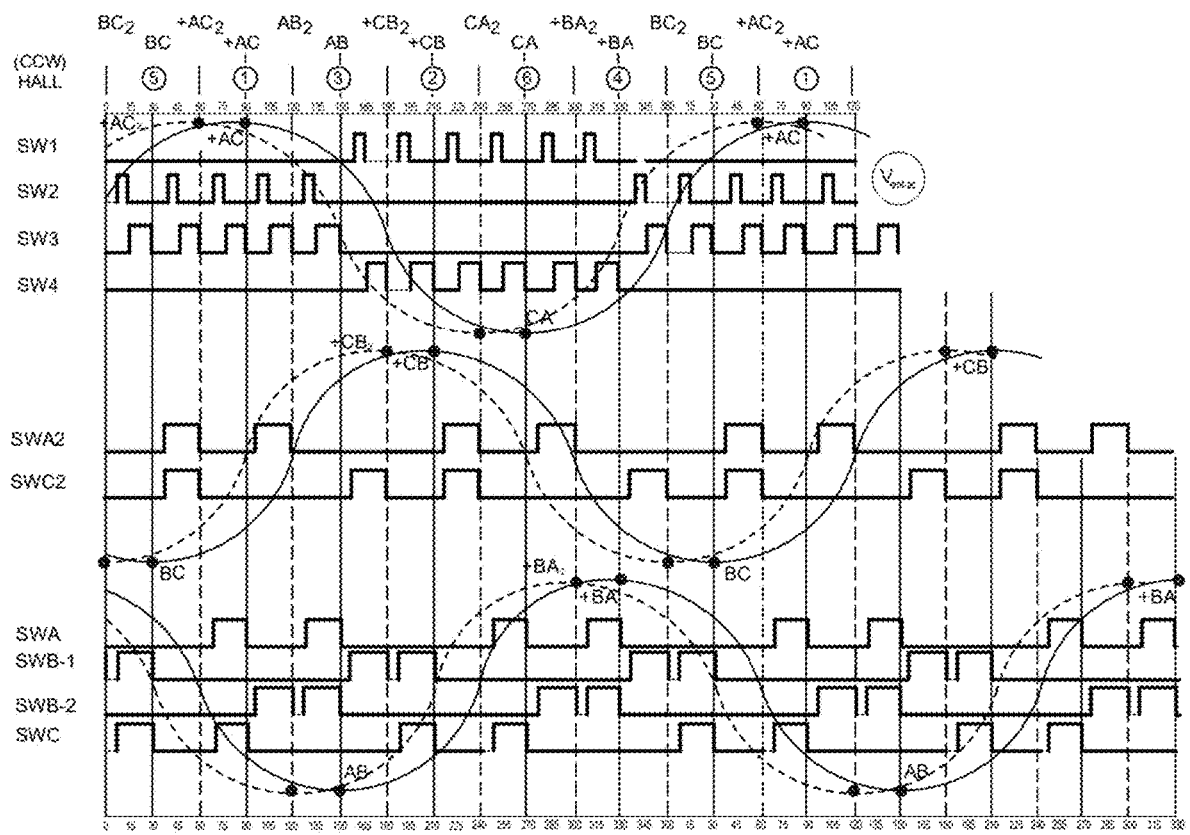
FIG. 3, in a schematic view, illustrates a timing diagram in a method of operation of the electric motor of FIG. 1.

Operation of the motor 10 is now described with respect to FIG. 3. The state of the motor 10 changes 3 times within a range of 30 degrees of rotation of the rotor 32, between the three phases of the motor 10 (powered, regeneration, and passive). Each coil equivalent 21 to 29 goes successively through a powered phases, in which a voltage is applied thereacross, followed immediately by a regeneration phases, in which at least part of the energy stored in the magnetic field of the coil equivalents 21 to 29 during the powered phase is recovered into one of the capacitors C1 or C2, and then a passive phase, in which the coil equivalent 21 to 29 is disconnected from the terminals T1 to T4 so the coil equivalent 21 to 29 is an open circuit with the terminals T1 to T4. This cycle of phases is then repeated, but with an inverse polarity. In the powered phase, the application of a voltage across the coil equivalent 21 to 29 is performed using one of the first and second batteries 16 and 18, using one of the capacitors C1 and C2, or using a combination of the first and second batteries 16 and 18 and one of the capacitors C1 and C2. The powered, regeneration and passive phases correspond respectively to powered, regeneration and passive modes of operation of the coils 21a to 29b.

In the embodiment described in the present document, in the powered phase, the capacitor C1 or C2 connected to the power module 14 is in parallel with a corresponding one of the first and second batteries 16 and 18, as the diodes D1 and D2 then only allow current to flow out of the first and second batteries, with negligible resistance, corresponding to a parallel powering of the coils 21a to 29b. Also, the capacitors C1 and C2 connected to coils 21a to 29b in immediate successive powered and generation phases alternate, and polarity is reversed at the next pair of powered and regeneration phase.

During the powered phase, the voltage applied to the coils 21a to 29b is a pulse of DC voltage, which may vary in time according to an exponential decay when the capacitors C1 and C2 are discharged in the coil equivalents 21 to 29. This application of voltage will create an increasing magnetic field in the coils 21a to 29b. During this powered phase, power is not necessarily delivered for the whole duration of the 15 degrees of rotation of the rotor 32. Longer application of voltage result in larger magnetic fields, and therefore larger torques at the rotor 32. Therefore, changing the fraction of this phase during which voltage is actually applied can be used to regulate the torque exerted by the motor 10.

During the regeneration phase, the first and second batteries 16 and 18 and the capacitors C1 and C2 don't provide power to the coils 21a to 29b. Instead, the polarity of the connection between the coils 21a and 29b and the power terminals T1 and T2 is reversed, when compared to the previous regeneration phase, and the energy stored in the magnetic field of the coils 21a to 29b is fed to one of capacitors C1 and C2. The other capacitor C1 or C2, which remains in parallel with respectively the first and second batteries 16 and 18, is used as a potential pump, with the two capacitors having their anodes connected to each other, which assists in transferring the energy stored in the coil's magnetic field to the capacitor C1 or C2.

FIG. 3 is a timing diagram illustrating the state of each switch SW1, SW2, SW3, SW4, SWA, SWA2, SWB-1, SWB-2, SWC and SWC2 during operation of the motor 10. This timing diagram is periodic with each rotation of the motor. A high state denotes a closed switch SW1, SW2, SW3, SW4, SWA, SWA2, SWB-1, SWB-2, SWC and SWC2, allowing electrical connection thereacross. A low state denotes an open switch SW1, SW2, SW3, SW4, SWA, SWA2, SWB-1, SWB-2, SWC and SWC2 in which no current flows through the switch SW1, SW2, SW3, SW4, SWA, SWA2, SWB-1, SWB-2, SWC and SWC2. The undulating sinusoidal continuous and dashed lines illustrate the 3 phases of the delta configuration (dashed line) and of the wye configuration (continuous line). The phase to which a 30 degrees block related is denoted at the top of the diagram for each 30 degrees block, and the horizontal axis corresponds to the angular position of the rotor with respect to an origin. Typically, the rotor 32 lags slightly to position of a coil 21a to 29a when the latter reaches its peak phase voltage. This offset improves motor efficiency, and is calculated by the controller 100. Theoretical calculations or empirical results may be used to get the correct offset, which, in some embodiments, may vary according to the load applied to the motor 10 and rotation speed of the rotor 32. The wye and delta configurations are powered in alternance.

Switches SW1 and SW2 are used in the powered phases, and the duration of their high state can therefore be varied. Switches SW3 and SW4 are used in the regeneration phase, and they are typically in their high state for almost the whole duration of the regeneration mode, but these switches SW3 and SW4 can be easily adjusted to remain closed by the controller for a lower duration depending how many times full recovery process is needed, as the diodes D1 to D4 prevent oscillation of the LC circuit that is created during this phase. In the regeneration phase, diodes D3 and D4 is used to stop energy transfer when the magnetic circuit coils 21a to 29b are empty. and also prevents the charge of C1 from balancing in C2 and vice versa. At all times, diodes D1 and D2 especially prevent capacitors C1 and C2 from draining into their respective batteries. A small delay is usually introduced between the change in state of the switches SW1, SW2, SW3, SW4, SWA, SWA2, SWB-1, SWB-2, SWC and SWC2 to allow for the switches SW1, SW2, SW3, SW4, SWA, SWA2, SWB-1, SWB-2, SWC and SWC2 to completely switch off when required, so that no short circuit is created. Table 2 includes the sequence of operation of the switches SW1, SW2, SW3, SW4, SWA, SWA2, SWB-1, SWB-2, SWC and SWC2 in a different form.

An example of one powered/regeneration cycle is now described, with the understanding that the other corresponding cycles are similar and follow the sequence of FIG. 3 and Table 2. In this example, the powered phase and regeneration phase of coil equivalents 21 and 27 is described. In the powered phase, switches SW2, SWA and SWC are closed simultaneously. This creates a circuit in which a tension is applied between nodes A and C from power terminals T3 and T4, which creates an increasing current in coil equivalents 21 and 27. The increasing current will create a magnetic field in coils 21a, 21b, 27a and 27b, which can attract the rotor 32 to provide a torque thereonto if this phase is suitably timed. This timing will depend on the configuration of the magnetic fields of the stator 30 and rotor 32 and can be determined using experimental data or simulations. As mentioned, this powered phase will last for at most 15 degrees of rotation of the rotor 32, but can be shorter. The duration of the powered phase can be adjusted for as a function of motor 10 rotation speed and load.

Once the powered phase has been completed, typically when current peak is reached, the regeneration phase begins. To that effect, switch SW2 is open and switch SW3 is closed, typically simultaneously. This disconnects coil equivalents 21 and 27 from terminal T3 and T4, and connects them instead to power terminal T2 and T4. This also reverses the polarity of the coil equivalents 21 and 27, and the current circulating in the coil equivalents 21 and 27 start to increase rapidly to reach a second current peak higher than the first one, followed by a current decrease. This regenerative pulse current creates a tension that will charge capacitor C1. Therefore, the energy that was stored in the magnetic field of the coils 21a, 21b, 27a and 27b is transferred to an electric field in the capacitor C1. It is worth noting that the potential of C2 serves to raise the voltage potential towards the terminal T1 in order to obtain a faster and more complete charge towards C1. In this manner, we can ensure in some embodiments complete transfer of the energy stored previously in the magnetic circuit of coil equivalents 21 and 27. Since resistances in the components of the electric motor 10 can be relatively small, this transfer has a very large efficiency, approaching 100%. If timing of this phase is suitably chosen, a torque is sill exerted by coils 21a, 21b, 27a and 27b on the rotor 32 during this phase. Once the regeneration phase is completed, switches SW3, SWA and SWC are open so that the passive phase is now reached, and the powered and regeneration phases start for another coil pair. The tension achieved across the capacitor C1 can reach values much higher than the value of the tension provided by the first battery 16, which is possible because of the diode D1.

Figure 5A:
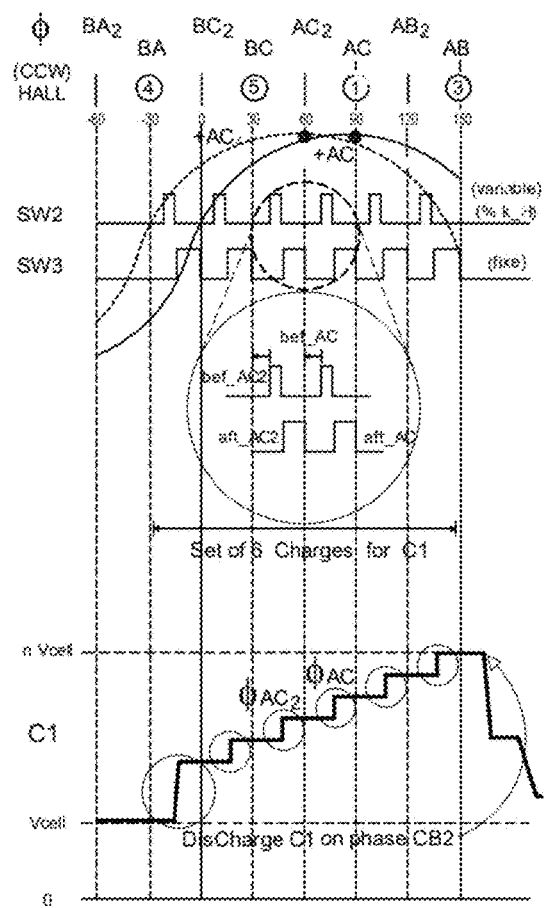
FIG. 5A, in a schematic view, illustrates charge and discharge of capacitor C1 of FIG. 1 as a function of some phases of the timing diagram of FIG. 3.
Figure 5B:
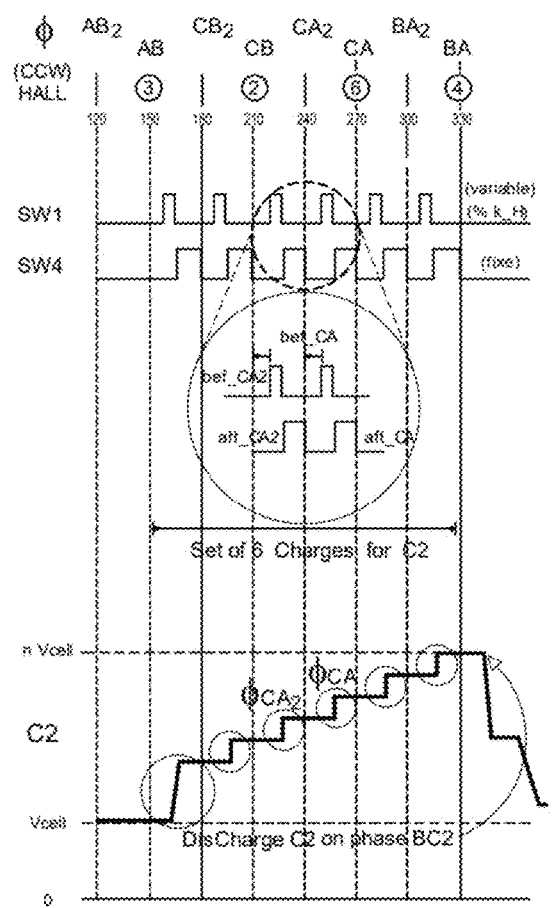
FIG. 5B, in a schematic view, illustrates charge and discharge of capacitor C2 of FIG. 1 as a function of some phases of the timing diagram of FIG. 3.

Due to the specific manner in which the capacitors C1 and C2 are connected to the coil equivalents 21 to 29, each capacitor C1 and C2 will undergo 6 charging cycle before being discharged, as seen in FIGS. 5A and 5B. When this occurs, a very large tension is created, which creates a much larger torque in the electric motor during this phase than in other powered phases. Also, during each rotation of the electric motor 10, each of the phases of the motor will undergo two powered phases, with opposite polarities, each followed by a corresponding regeneration phase.

The proposed motor 10 can also recover energy when a vehicle stops or goes downhill by modulating the switches SW3 or SW4 in accordance with the position of the rotor 32, so that the latter can induce a magnetic field in the coils 21a to 29b. In this latter mode, switches SW1 and SW2 are closed in alternance, and the other switches are modulated to recover energy generated in the coils 21a to 29b by the rotor 32. In some embodiments, the energy of the magnetic fields is recovered in the capacitors C1 or C2. In this mode, switches SW1 and SW2 are continuously open. In some embodiments, for more energy storage, the circuit of FIG. 1 can be modified by adding additional switches in parallel with diodes D1 and D2, which can then allow the energy generated by the stator in the coils to be fed back to the first and second batteries 16 and 18.

The proposed architecture can be used in any application in which coils are alternatively powered and unpowered, For example, three triphasic transformers can be connected to form the circuit of FIG. 1, and these transformers can then be used to provide triphasic current from the power module 12. The nine coil equivalents 21 to 29 can also be part of three different standard triphasic motors synchronized to each other, synchronized mechanically in series or in parallel. Indeed, the circuit of FIG. 1 is agnostic regarding the exact device that is connected to the power module 12, as long as this device includes inductances configured as in the motor module 14. It should be noted that starting from a standstill requires a different sequence of operation, similarly to other types of electric motors. The motor 10 will typically need to spin a few turns for the controller before the controller can use the sequence of actions illustrated in FIG. 3.

TABLE 2

Sequence of operation of the motor 10 showing the various phases of operation, each lasting over 15 degrees of rotation of the stator.

| PHASE | SW1 | SW2 | SW3 | SW4 | SWA | SWA2 | SWB-1 | SWB-2 | SWC | SWC2 |
| --- | --- | --- | --- | --- | --- | --- | --- | --- | --- | --- |
| P1-BC | O | C | O | O | O | O | C | O | C | O |
| R1-BC | O | O | C | O | O | O | C | O | C | O |
| P2-AC2 | O | C | O | O | O | C | O | O | O | C |
| R2-AC2 | O | O | C | O | O | C | O | O | O | C |
| P3-AC | O | C | O | O | C | O | O | O | C | O |
| R3-AC | O | O | C | O | C | O | O | O | C | O |
| P4-AB2 | O | C | O | O | O | C | O | C | O | O |
| R4-AB2 | O | O | C | O | O | C | O | C | O | O |
| P5-AB | O | C | O | O | C | O | O | C | O | O |
| R5-AB | O | O | C | O | C | O | O | C | O | O |
| P6-CB2 | C | O | O | O | O | O | C | O | O | C |
| R6-CB2 | O | O | O | D | O | O | C | O | O | C |
| P7-CB | C | O | O | O | O | O | C | O | C | O |

TABLE 2-continued

Sequence of operation of the motor 10 showing the various phases of operation, each lasting over 15 degrees of rotation of the stator.

| PHASE | SW1 | SW2 | SW3 | SW4 | SWA | SWA2 | SWB-1 | SWB-2 | SWC | SWC2 |
|---|---|---|---|---|---|---|---|---|---|---|
| R7-CB | O | O | O | C | O | O | C | O | C | O |
| P8-CA2 | C | O | O | O | O | C | O | O | O | C |
| R8-CA2 | O | O | O | C | O | C | O | O | O | C |
| P9-CA | C | O | O | O | C | O | O | O | C | O |
| R9-CA | O | O | O | C | C | O | O | O | C | O |
| P10-BA2 | C | O | O | O | O | C | O | C | O | O |
| R10-BA2 | O | O | O | C | O | C | O | C | O | O |
| P11-BA | C | O | O | O | C | O | O | C | O | O |
| R11-BA | O | O | O | C | C | O | O | C | O | O |
| P12-BC2 | O | C | O | O | C | O | C | O | O | C |
| R12-BC2 | O | O | C | O | O | O | C | O | O | C |

P: Powered mode. R: Regeneration mode. O: Open switch. C: Closed switch

Figure 6:
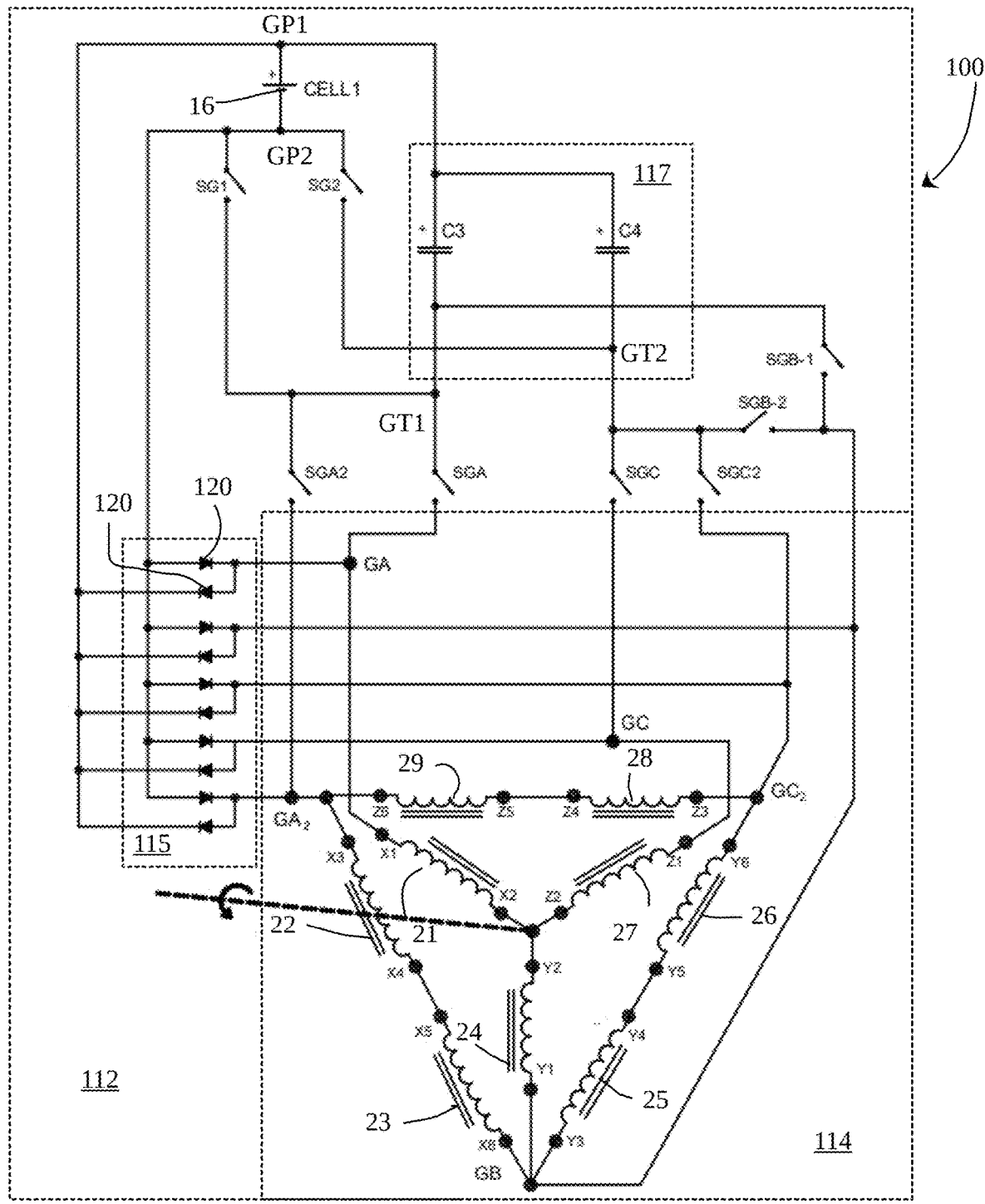
FIG. 6, in a schematic view, illustrates the electric circuit of an electric generator in accordance with an embodiment of the present invention.

FIG. 6 illustrates schematically the electric circuit representing a proposed electric generator 100. The generator 100 includes a power management module 112 and a generator module 114. The power management module 112 includes the various components required to selectively receive current from the generator module 114 when an increasing magnetic flux in coils present in the generator module creates an electromotive force, and recover at least part of the magnetic energy stored in the generator module 114 when the magnetic flux decreases or is interrupted. The generator module 114 includes components that will create an electromotive force to be received by the power management module 112 as further described below. The power management module 112 is typically used to provide power to a load, for example in the form of a battery 16, although more than one battery or other typed of loads could be used in alternative embodiments. The battery 16 includes for example one or more lithium-ion cells, or any other types of battery cells usable to store direct current. In other embodiments, the battery 16 is replaced by a supercapacitor.

The battery 16 is connected at the anode to a first power output terminal GP1 and at the cathode to a second power output terminal GP2. While the battery 16 is shown as part of the power management module 112 in FIG. 6, in some embodiments, the battery 16 is remote from the power management module 112 and not part thereof.

The generator module 114 includes five output nodes GA, $GA_2$, GB, GC and $GC_2$. Tension can be created between selected pairs of the five output nodes GA, $GA_2$, GB, GC, and $GC_2$ to create a tension between the first and second terminals GT1 and GT2. The circuit and physical structure of the generator module 114 is similar to that of the motor module 14, and is therefore not further described. All the characteristics of the motor module 14 described above also apply to the generator module 114. The correspondence between the description of the motor and generator modules 14 and 114 can be made by noting that the output nodes GA, $GA_2$, GB, GC and $GC_2$ in the generator module 114 correspond to the input nodes A, $A_2$, B, C and $C_2$ in the motor module 14.

The power management module 112 includes a recovery circuit module 115, a power circuit module 117 and eight switches SG1, SG2, SGA, SGA2, SGB-1, SGB-2, SGC and SGC2. The power management module 112 also defines first and second terminals GT1 and GT2. The switches SG1, SG2, SGA, SGA2, SGB-1, SGB-2, SGC and SGC2 are selectively openable and closable so that the coil equivalents 21 to 29 are operable in a power mode and in a recovery move. In the power mode, a subset of the coil equivalents 21 to 29 is in series in with the power circuit module 117 between the first and second power output terminals GP1 and GP2 to allow creation of a voltage between the first and second power output terminals GP1 and GP2 due to an induced electromotive force created by an increase of magnetic flux in the subset of the coil equivalents 21 to 29 caused by rotation of the rotor 32. In this mode, the generator module 114 and power circuit module 117 form a power circuit. In the recovery mode, the subset of the coil equivalents 21 to 29 is in series with the recovery circuit module 115, which is distinct from the power circuit module 117, between the first and second power output terminals GP1 and GP2 to recover between the first and second output terminals GP1 and GP2 at least part of energy stored in the subset of the coil equivalents 21 to 29 during operation in the power mode. The generator module 114 and the recovery circuit module form a recovery circuit. Typically, for each coil equivalent 21 to 29, the power mode is followed by the recovery mode before a subsequent power mode, and the coil equivalent 21 to 29 is further operable in a passive mode wherein there is an absence of energy transfer from the given coil to the power output terminals GP1 and GP2.

In a specific embodiment of the invention, the recovery circuit module 115 acts as a rectifying circuit and extends between the five output nodes GA, $GA_2$, GB, GC, and $GC_2$ and the first and second output terminals GP1 and GP2 without any intervening switch. In other words, the five output nodes GA, $GA_2$, GB, GC, and $GC_2$ are permanently connected to the first and second power output terminals GP1 and GP2 through the recovery circuit module 115. The recovery circuit module 115 includes five pairs of diodes 120, only a few of which are numbered in FIG. 6 for clarity reasons. Each pair of diodes 120 extends between a respective one of the five output nodes GA, $GA_2$, GB, GC, and $GC_2$ and the first and second power output terminals GP1 and GP2, so that current can only flow from the output nodes GA, $GA_2$, GB, GC, and $GC_2$ towards the first power input terminal GP1 and from the second input terminal GP2 towards the output nodes GA, $GA_2$, GB, GC, and $GC_2$.

In a specific embodiment of the invention, the power circuit module 117 includes a pair of capacitors C3 and C4. The capacitors C3 and C4 are both electrically connected to the first power output terminals GP1. The capacitors C3 and C4 are respectively electrically connected to the first and second terminals GT1 and GT2 at their cathode.

Switches SG1 and SG2 control the flow of current within the power management module 112, while switches SGA, SGA2, SGB-1, SGB-2, SWC and SGC2 control the flow of current between the power management module 112 and respectively nodes GA, GA$_2$, GB, GB, GC and GC$_2$. One can note that two switches, SGB-1 and SGB-2 control connection of the power management module 112 to the node GB. The other switches SGA, SGA2, SGC and SGC2 each control connection between the power management module 112 and a single one of the nodes GA, GA$_2$, GC and GC$_2$. Switches SGA, SGA2 and SGB-1 extend between the terminal GT1 and respectively nodes GA, GA$_2$ and GB. Switches SGC, SGC2 and SGB-2 extend between the terminal GT2 and respectively nodes GC, GC$_2$ and GB. Switches SG1 and SG2 extend respectively between terminals GT1 and GT2 and the power output terminal GP2.

When switch SG1 is closed, the first capacitor C3 is in parallel with the first and second power output terminals GP1 and GP2. Also, when switch SG1 is closed, the first terminals GT1 and second power terminal GP2 are always at a positive voltage coming from coils 21a to 29b compared to a negative voltage at the second terminal GT2. When switch SG2 is closed, the second capacitor C4 is in parallel with the first and second power output terminals GP1 and GP2. When switch SG2 is closed, the second terminal GT2 and second power terminals GP2 are always at a positive voltage coming from coils 21a to 29b compare to a negative voltage at the second terminal GT1. In each power mode, one of the first and second capacitors C3 or C4 is in parallel with the first and second power output terminals GP1 and GP2 due to a respective one of the switches SG1 and SG2 being closed. The other capacitor C3 or C4 is in series with the coil equivalents 21 to 29 from which energy is received, so that a series circuit including these coil equivalents 21 to 29 and this last capacitor C3 or C4 are in series between the power output terminals GP1 and GP2.

The reader skilled in the art will understand the exact number and configuration of the various components of the power management module 112 may vary according to the exact embodiment of the invention without departing from the scope of the claims. The switches SG1, SG2, SGA, SGA2, SWB-1, SGB-2, SGC and SGC2 are typically high speed electronic power switches allowing to rapidly switch between open and closed states and to carry in the closed state relatively large currents. The capacitors C3 and C4 could be individual physical capacitors, or banks of such physical capacitors, or supercapacitors. The capacitors C3 and C4 can be charged and discharged relatively rapidly under relatively large tensions to receive and release electric energy in the form of charges stored on metal components separated from each other by a dielectric material. This is to be contrasted to batteries, which use electrochemical reactions to store energy.

The generator 100 may be controlled by the controller 48, or a similar controller. The structure of controllers 48 usable to control the motor 10 and the generator 100 may be similar to each other, but typically execute different software. When the generator 100 is controlled, the reference number 50 of FIG. 4 represents switches SG1, SG2, SGA, SGA2, SGB-1, SGB-2, SGC and SGC2.

The generator 100 is also typically provided with the position sensor 52 for sensing a position of the rotor 32 relative to the stator 30 and feeding this information to the controller 48 to time the power phases for the coils 21a to 29b. In some embodiments, the position sensor 52 is also used to sense a rotation speed of the rotor 32 relative to the stator 30. However, in alternative embodiments, the rotation speed is detected using a dedicated speed sensor 54.

Figure 7:
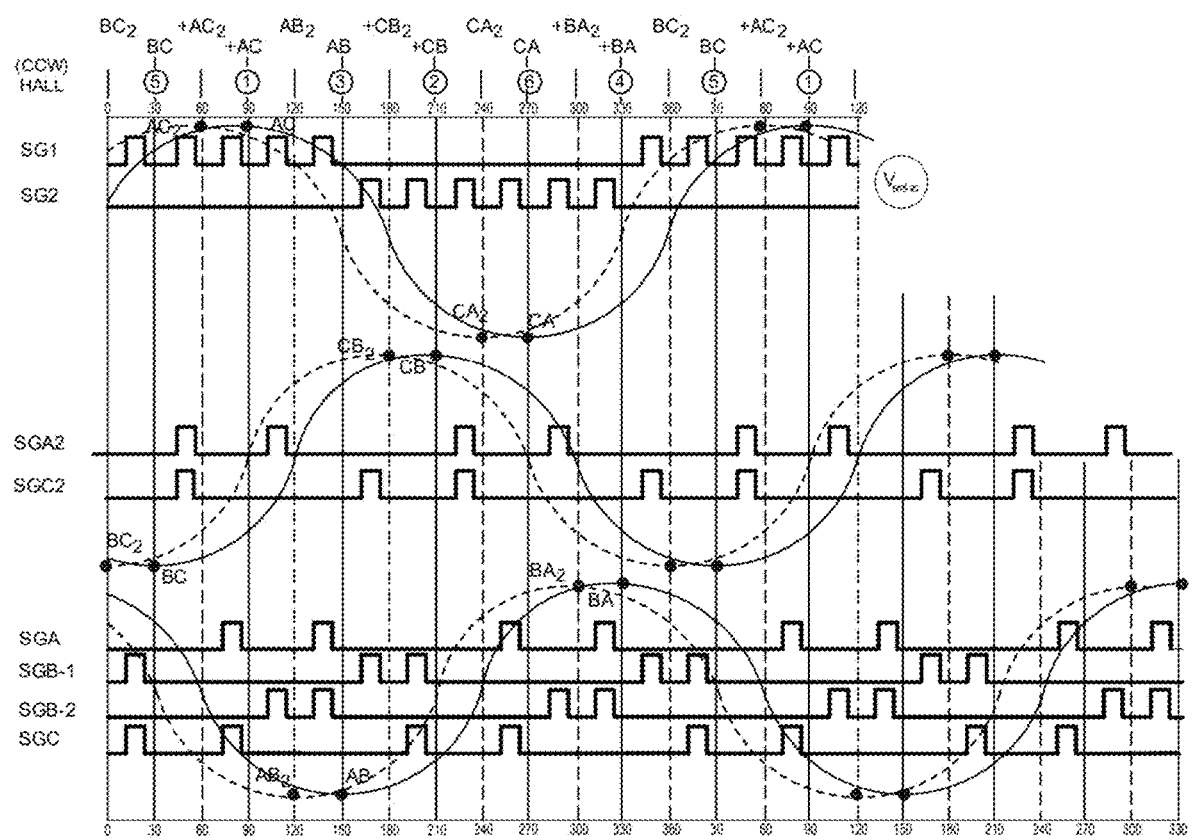
FIG. 7, in a schematic view, illustrates a timing diagram in a method of operation of the electric generator of FIG. 6.

Operation of the generator 100 is now described with respect to FIG. 7. The state of the generator 10 changes 3 times within a range of 30 degrees of rotation of the rotor 32, between the three phases of the generator 100 (power, recovery, and passive). Each coil equivalent 21 to 29 goes successively through a power phase, in which a voltage is induced thereacross due to rotation of the rotor 32, followed immediately by a recovery phase, in which at least part of the energy stored in the magnetic field of the coil equivalents 21 to 29 during the power phase is provided to the first and second output terminals GP1 and GP2 through the recovery circuit module 115, and then a passive phase, in which the coil equivalent 21 to 29 don't transfer energy to the first and second output terminals GP1 and GP2. This cycle of phases is then repeated, but with an inverse polarity, after rotation of the rotor 32 by about 180 degrees. The power, recovery and passive phases correspond respectively to power, recovery and passive modes of operation of the coils 21a to 29b. During the recovery and passive phases, the switches SG1, SG2, SGA, SGA2, SGB-1, SGB-2, SGC and SGC2 are open, and therefore carry no current, which can allow them to cool down. Also, the capacitors C3 and C4 then are disconnected from the power output terminal GP2 at their cathode, and therefore present a constant charge.

In the power mode, the capacitor C3 or C4 that is in parallel with the first and second output terminals GP1 and GP2 can act as a pump to increase the tension produced across the other capacitor C3 or C4, which promotes a faster increase in the current passing through the relevant coil equivalents 21 to 29 if residual charges are still present in this capacitor C3 or C4 that is in parallel with the first and second output terminals GP1 and GP2. These residual charges have been introduced in this capacitor C3 or C4 in previous phases of operation of the generator 100, when this specific capacitor C3 or C4 was in the series circuit. In the power mode, the induced voltage induced in selected ones of the coils 21a to 29b is directly added to a voltage from the first capacitor C3 or C4 in series in the circuit, creating a new double voltage source. This capacitor C3 and C4 also has enough tension to provide power at the output terminals GP1 and GP2, and will never have a voltage lower than voltage between terminals GP1 and GP2. This new double voltage source will also charge the second capacitor C3 or C4 also in series in the circuit, thus creating an intense peak current in the coils equivalent 21 to 29. During a full turn of the rotor 32, each capacitor C3 or C4 will be in the series circuit for half the power phases. These power phases may be consecutive, so that for example capacitor C3 is in the series circuit for 6 consecutive power phases, followed by the capacitor C4 being in the series circuit the nest 6 consecutive power phases, followed by repetition of this cycle. In other embodiments, as described below, each capacitor C3 or C4 is in the series circuit for at most 2 successive power phases, which may allow one to use small capacity capacitors. Indeed, when the capacitors C3 and C4 have the same function in successive power phases, they will acquire larger charges, which may damage small capacity capacitors C3 or C4. Also, in some embodiments, when the capacitors C3 or C4 have been charged six consecutive times, the high voltage thus generated can slow down an optimum transfer of energy for the last successive charges, because their voltage level too high in the series circuit and conflicts with the maximum threshold reached by the induced voltage of the generator in some speed regimes.

FIG. 7 is a timing diagram illustrating the state of each switch SG1, SG2, SGA, SGA2, SGB-1, SGB-2, SGC and SGC2 during operation of the generator 100. This timing diagram is periodic with each rotation of the generator 100. A high state denotes a closed switch SG1, SG2, SGA, SGA2, SGB-1, SGB-2, SGC and SGC2, allowing electrical connection thereacross. A low state denotes an open switch SG1, SG2, SGA, SGA2, SGB-1, SGB-2, SGC and SGC2 in which no current flows through the switch SG1, SG2, SGA, SGA2, SGB-1, SGB-2, SGC and SGC2. The undulating sinusoidal continuous and dashed lines illustrate the 3 phases of the delta configuration (dashed line) and of the wye configuration (continuous line). The phase to which a 30 degrees block relates is denoted at the top of the diagram for each 30 degrees block, and the horizontal axis corresponds to the angular position of the rotor 32 with respect to an origin. Theoretical calculations or empirical results may be used to get the correct position at which the power mode should be activated to produce an optimal energy recovery from the mechanical torque applied to the rotor 32, which, in some embodiments, may vary according to the torque applied to the generator 100 and rotation speed of the rotor 32. The wye and delta configurations are powered in alternance. Table 3 includes the sequence of operation of the switches SG1, SG2, SGA, SGA2, SGB-1, SGB-2, SGC and SGC2 in a different form. It should be noted that the switches SG1, SG2, SGA, SGA2, SGB-1, SGB-2, SGC and SGC2 may be closed for a variable duration, depending on the mechanical and electrical properties of the generator 100.

An example of one power/recovery cycle is now described, with the understanding that the other corresponding cycles are similar and follow the sequence of FIG. 7 and Table 3. In this example, the power phase and recovery phase of coil equivalents 21 and 27 is described. In the power phase, switches SG1, SGA and SGC are closed simultaneously. This creates a series circuit in which a tension is applied between the first and second terminals GT1 and GT2, due to the induced electromotive force caused by rotation of the rotor 32, caused by an external torque, which creates an increase in the magnetic flux in coils 21a, 21b, 27a and 27b. As mentioned, this power phase will last for at most 15 degrees of rotation of the rotor 32, but can be shorter.

Once the power phase has been completed, typically when current peak is reached in the coils 21a, 21b, 27a and 27b, the recovery phase begins. To that effect, SG1, SGA and SGC are opened simultaneously. This disconnects coil equivalents 21 and 27 from the power circuit module 117. Due to the inductance of the coils 21a, 21b, 27a and 27b, which resists an abrupt interruption in current circulation in the coils 21a, 21b, 27a and 27b, a tension will be applied across the first and second output terminals GP1 and GP2 through the recovery circuit module 115. In this manner, we can ensure in some embodiments complete transfer of the energy stored previously in the magnetic circuit of coil equivalents 21 and 27. Since resistances in the components of the generator 100 can be relatively small, this transfer has a very large efficiency.

TABLE 3

Sequence of operation of the generator 100 showing the various power phases of operation. Each power phase is followed by a recovery phase in which all swicthes are open.

| PHASE | SG1 | SG2 | SGA | SGA2 | SGB-1 | SGB-2 | SGC | SGC2 |
|---|---|---|---|---|---|---|---|---|
| P1-BC | C | O | O | O | C | O | C | O |
| P2-AC2 | C | O | O | C | O | O | O | C |
| P3-AC | C | O | C | O | O | O | C | O |
| P4-AB2 | C | O | O | C | O | C | O | O |
| P5-AB | C | O | C | O | O | C | O | O |
| P6-CB2 | O | C | O | O | C | O | O | C |
| P7-CB | O | C | O | O | C | O | C | O |
| P8-CA2 | O | C | O | C | O | O | O | C |
| P9-CA | O | C | C | O | O | O | C | O |
| P10-BA2 | O | C | O | C | O | C | O | O |
| P11-BA | O | C | C | O | O | C | O | O |
| P12-BC2 | C | O | O | O | C | O | O | C |

O: Open switch. C: Closed switch.

Figure 8:
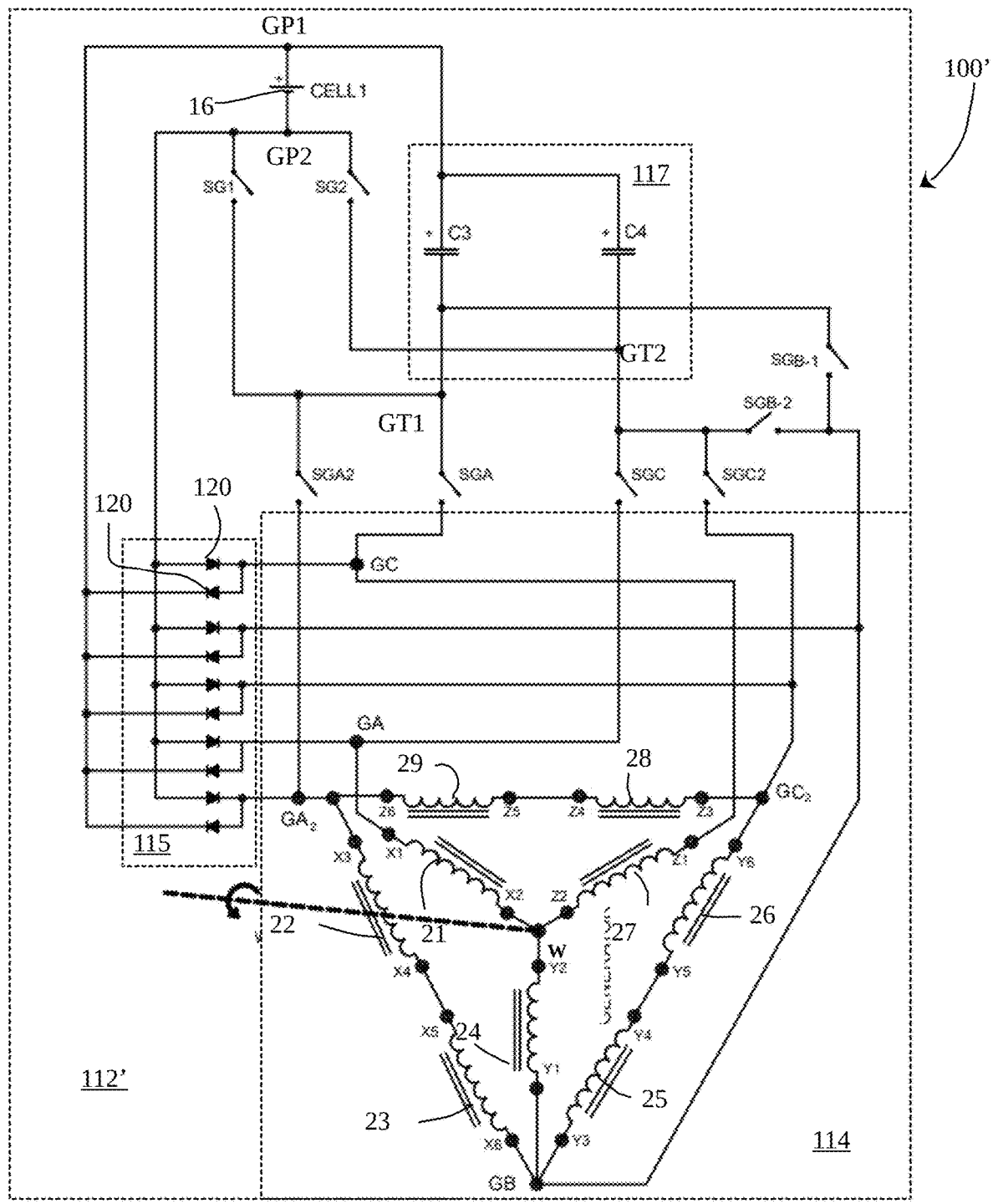
FIG. 8, in a schematic view, illustrates the electric circuit of an electric generator in accordance with an alternative embodiment of the present invention.
Figure 9:
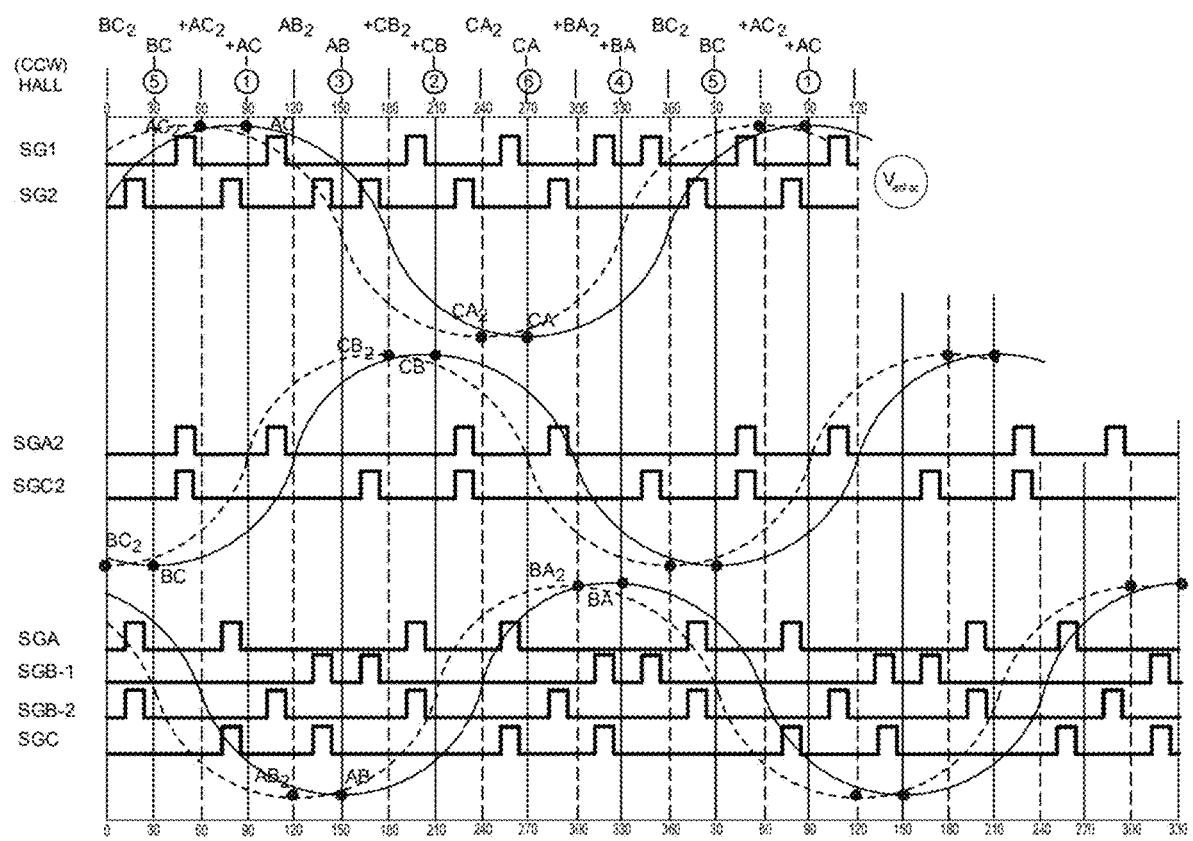
FIG. 9, in a schematic view, illustrates a timing diagram in a method of operation of the electric generator of FIG. 8.

FIG. 8 illustrates the electrical circuit of an alternative generator 100'. The generator 100' is similar to the generator 100, except that switch SGA now extends between terminal GT1 and node GC, and the switch SGC now extends between terminal GT2 and node GA. FIG. 9 and Table 4 illustrate the sequence of operation of the generator 100'. The generator 100' is similar to the generator 100, except that each of the capacitors C3 and C4 is now in the series circuit in at most two consecutive power phases, and in many phases for only one power phase, followed by a phase in which the other capacitor C3 or C4 is in the series circuit. Otherwise, the generator 100 and 100' operate in similar manners, and the details of their operation is therefore not described in details.

TABLE 4

Sequence of operation of the generator 100' showing the various power phases of operation. Each power phase is followed by a recovery phase in which all swicthes are open.

| PHASE | SG1 | SG2 | SGA | SGA2 | SGB-1 | SGB-2 | SGC | SGC2 |
|---|---|---|---|---|---|---|---|---|
| P1-BC | O | C | C | O | O | C | O | O |
| P2-AC2 | C | O | O | C | O | O | O | C |
| P3-AC | O | C | C | O | O | O | C | O |
| P4-AB2 | C | O | O | C | O | C | O | O |
| P5-AB | O | C | O | O | C | O | C | O |

TABLE 4-continued

Sequence of operation of the generator 100' showing
the various power phases of operation. Each power phase
is followed by a recovery phase in which all swicthes are open.

| PHASE | SG1 | SG2 | SGA | SGA2 | SGB-1 | SGB-2 | SGC | SGC2 |
|---|---|---|---|---|---|---|---|---|
| P6-CB2 | O | C | O | O | C | O | O | C |
| P7-CB | C | O | C | O | O | C | O | O |
| P8-CA2 | O | C | O | C | O | O | O | C |
| P9-CA | C | O | C | O | O | O | C | O |
| P10-BA2 | O | C | O | C | O | C | O | O |
| P11-BA | C | O | O | O | C | O | C | O |
| P12-BC2 | C | O | O | O | C | O | O | C |

O: Open switch. C: Closed switch.

Figure 10:
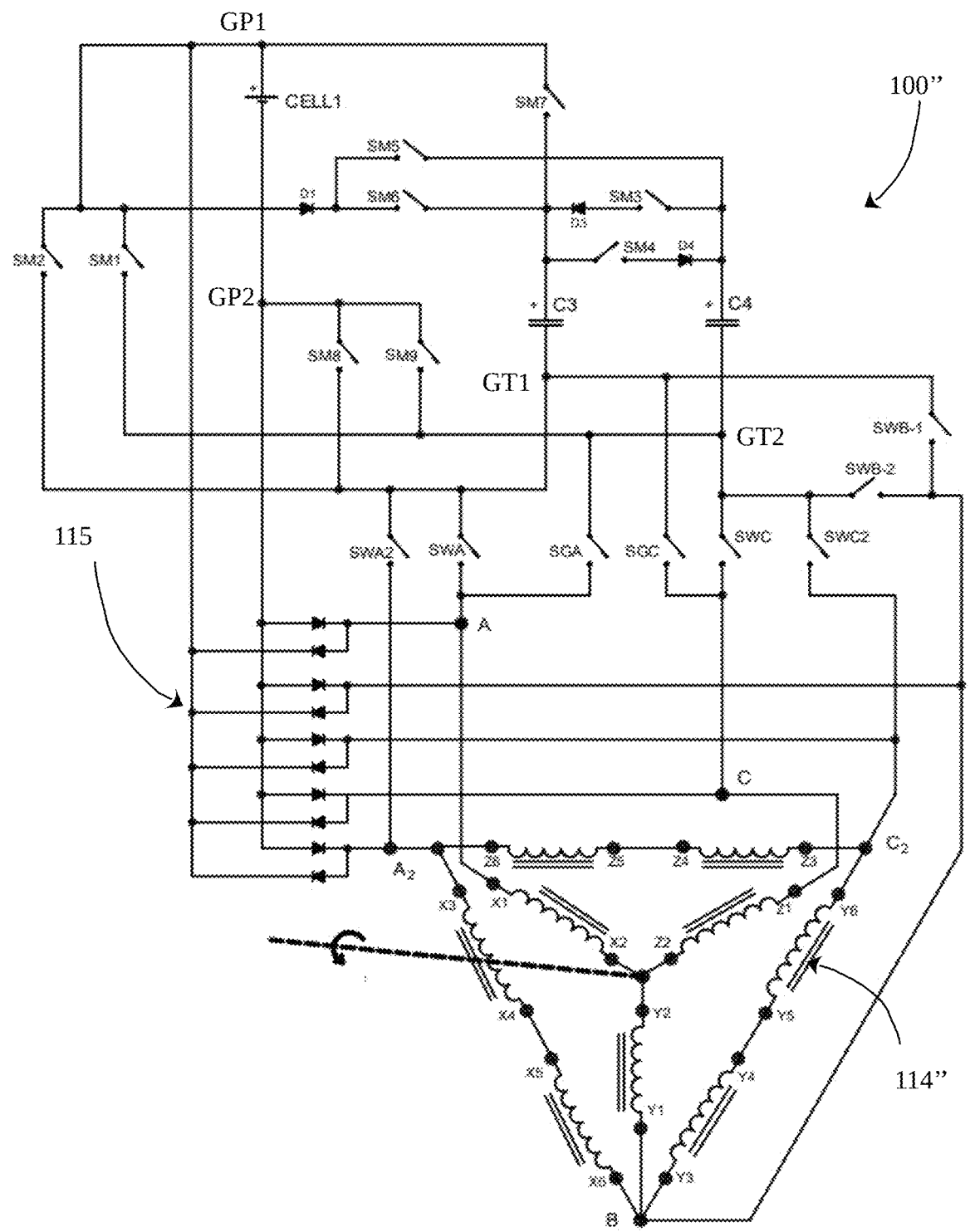
FIG. 10, in a schematic view, illustrates the electric circuit of an electric motor/generator in accordance with an embodiment of the present invention.

FIG. 10 illustrates a motor/generator 100" that combines the generator functionality of the generators 100 and 100' with the motor functionality of the motor 10. In FIG. 10, we have reverted to the notation A, $A_2$, B, C and $C_2$ for the nodes leading to the motor/generator module 114", which is similar to the generator module 114 and the motor module 14. Also, the rectifying circuit module 115 remains as in the generators 100 and 100'. However, when compared to the generator 100, many additional switches have been added to allow operation in both motor and generator modes when compared to the generator 100'.

There are 8 switches SWA2, SWA, SGA, SGC, SWC, SWC2 SWB-1 and SWB-2 that connect respectively to the nodes $A_2$, A, A, C, C, $C_2$, B and B to control their connection with the power management module 112". Therefore, nodes A and C now have two switches that connect thereto, in parallel. Switches SWA2, SWA, SWC, SWC2, SWB-1 and SWB-2 are used in the motor mode. Switches SWA2, SGA, SGC, SWC2, SWB-1 and SWB-2 are used in the generator mode. Switches SWA2, SWC, SWB-1 and SWA connect to terminal GT1. Switches SGA, SGC2, SWB-2 and SWC connect to terminal GT2.

The motor/generator 100" includes also switches SM1 to SM9. Two switches, SM8 and SM9, play a role similar to switches SG1 and SG2 when the motor/generator module 100" is operated in a generator mode, and extend between the power terminal GP2 and the terminals GT1 and GT2 respectively. When compared to the generator 100, a switch SM7 is added between the anodes of the capacitors C3 and C4 and the terminal GP1. The switch SM7 is closed in the generator mode, and open in the motor mode. Switches SM3 and SM4 are provided, along with diodes D3 and D4, between the anodes of the capacitors C3 and C4, and have a role similar to that of switches SW3 and SW4 and diodes D3 and D4 in the motor 10.

Switches SM1 and SM2 are provided between power terminal GP1 and respectively terminals GT2 and GT1. Also, a diode D1 in series with two parallel switches SM5 and SM6 extend between power terminal GP1 and the anodes and respectively capacitors C4 and C3.

When switch SM6 and SM8 are closed and switch SM5 and SM9 are open, terminals GT1 and GT2 of the generator 100" are equivalent to terminals T1 and T2 in the motor 10, and switches SM1 and SM2 operate as switches SW1 and SW2 of the motor 10. When switch SM5 and SM9 are closed and switch SM6 and SM8 are open, terminals GT1 and GT2 of the generator 100" are equivalent to terminals T3 and T4 in the motor 10, and switches SM1 and SM2 operate as switches SW1 and SW2 of the motor 10. Therefore, the addition of switches SM5, SM6, SM8 and SM9 allows one to use a single battery 16 to operate in motor mode.

Thus, the motor/generator module 100" can operate alternatively similarly to the motor 10 and to the generator 100, in motor and generator modes respectively. To operate in the generator mode, switches SM3 to SM7 are closed, while switches SM1 and SM2 remain open. The electrical circuit of the motor/generator 100" is then equivalent to that of the generator 100, with switches SM8 and SM9 being activated in a manner similar to switches SG1 and SG2. To operate in the motor mode, switches SM7 is open. Then switches SM1 to SM4 can be operated in a manner similar to the way they are operated in the motor 10. Switches (SM5 and SM9) or (SM6 and SM8) are alternately closed and open so that the battery 16 can operate alternatively like the battery 16 or the battery 18. The other switches, switches SWA2, SWA, SWC, SWC2 SWB-1 and SWB-2 in the motor mode and switches SWA2, SGA, SGC, SWC2 SWB-1 and SWB-2 in the generator mode, are closed and open as in the sequences described above for the motor 10 and the generator 100.

Figure 11:
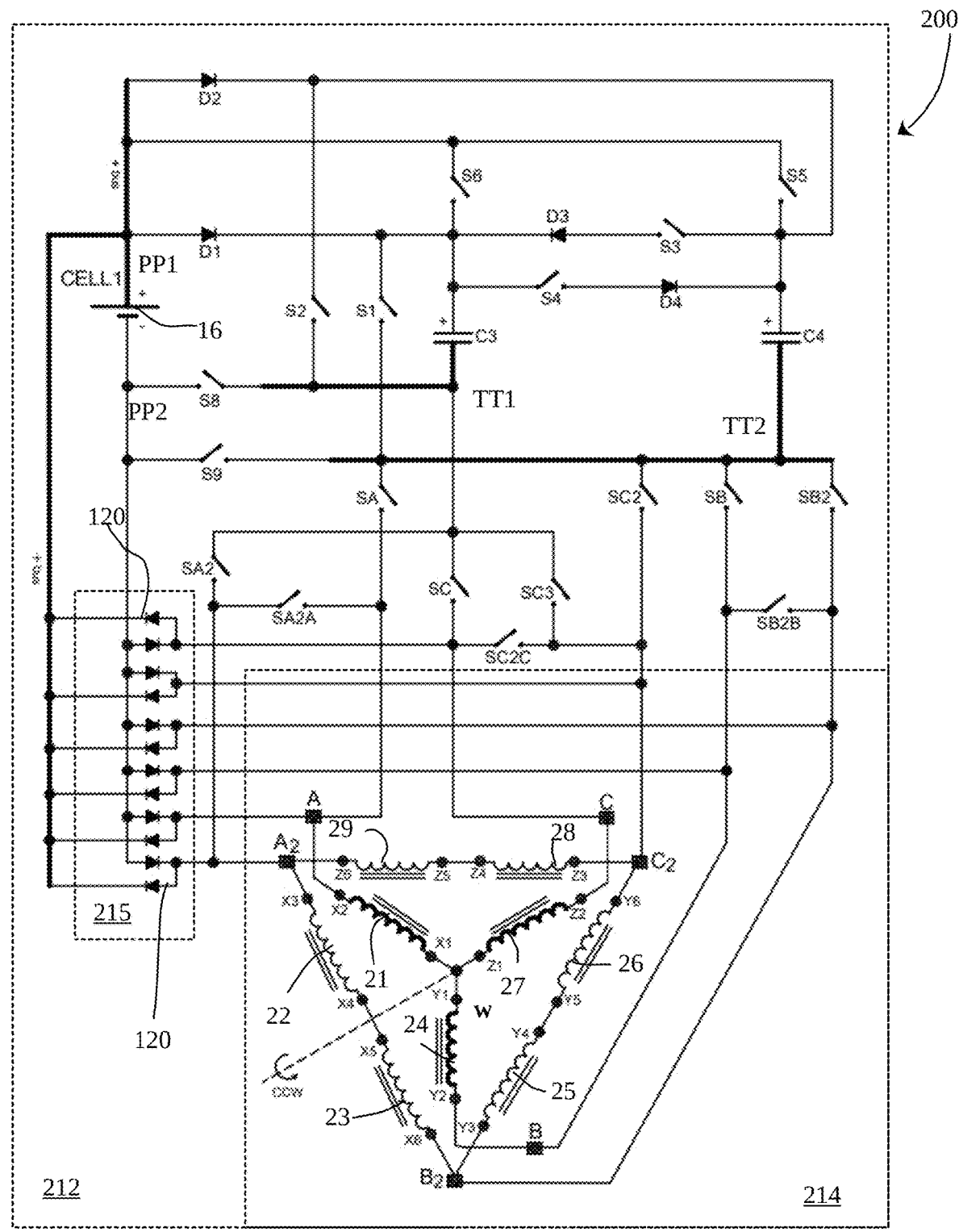
FIG. 11, illustrates the electric circuit of an electric motor in accordance with yet another embodiment of the present invention.

FIG. 11 illustrates schematically the electric circuit representing yet another alternative motor 200. The motor 200 is similar to the motor 10 and to the generators 100 and 100' in many respects, and there is an emphasis on the differences between the motor 200 and the motor 10, generator 100 and generator 100' in the following description, with common functionalities and structures described in less details or omitted altogether, with the understanding that these above-described features are also applicable to the present embodiment. The motor 200 includes a power management module 212 and a motor module 214. As in the devices described hereinabove, a battery 16, capacitors C3 and C4, and diodes D1 to D4 are present in the power management module 212. The motor 200 is usable both as a motor, to provide power to the motor module 214, and as a generator, to receive power from the motor module 214. As in the above-described devices, the motor 200 is powered by current pulses and the energy stored in the various coils of the motor module 214 is recovered at least in part after each coil has been powered.

As will be described below, the motor module 214 includes both a delta configuration and a wye configuration, as in the above-described devices. However, in contrast to these devices, the motor 200 simultaneously activates both the delta and wye configurations, which provides a relatively large torque, as many coils are used simultaneously. To that effect, in each of the powered and recovery modes, the coils from one of the edges are connected in series with the coils of two of the branches so that the delta and wye configurations are both simultaneous active. Also, this allows one to combine characteristics of wye and delta motor configurations in a single device, which may be advantageous in some applications.

The battery 16 is connected at the anode to a first power terminal PP1 and at the cathode to a second power terminal PP2. While the battery 16 is shown as part of the power management module 212 in FIG. 11, in some embodiments, the battery 16 is remote from the power management module 212 and not part thereof.

The motor module 214 includes six input nodes A, B, C, $A_2$, $B_2$ and $C_2$. This is one of the differences with the motor 10, as the latter included only 5 input nodes. In the motor module 214, the wye and delta configurations each have three input nodes, respectively input nodes A, B, and C; and $A_2$, $B_2$ and $C_2$, and they don't share a common node as in the motor 10. Tension can be provided to selected pairs of the six input nodes A, B, C, $A_2$, $B_2$ and $C_2$ to power selected portions of the delta and wye configurations.

Figure 12:
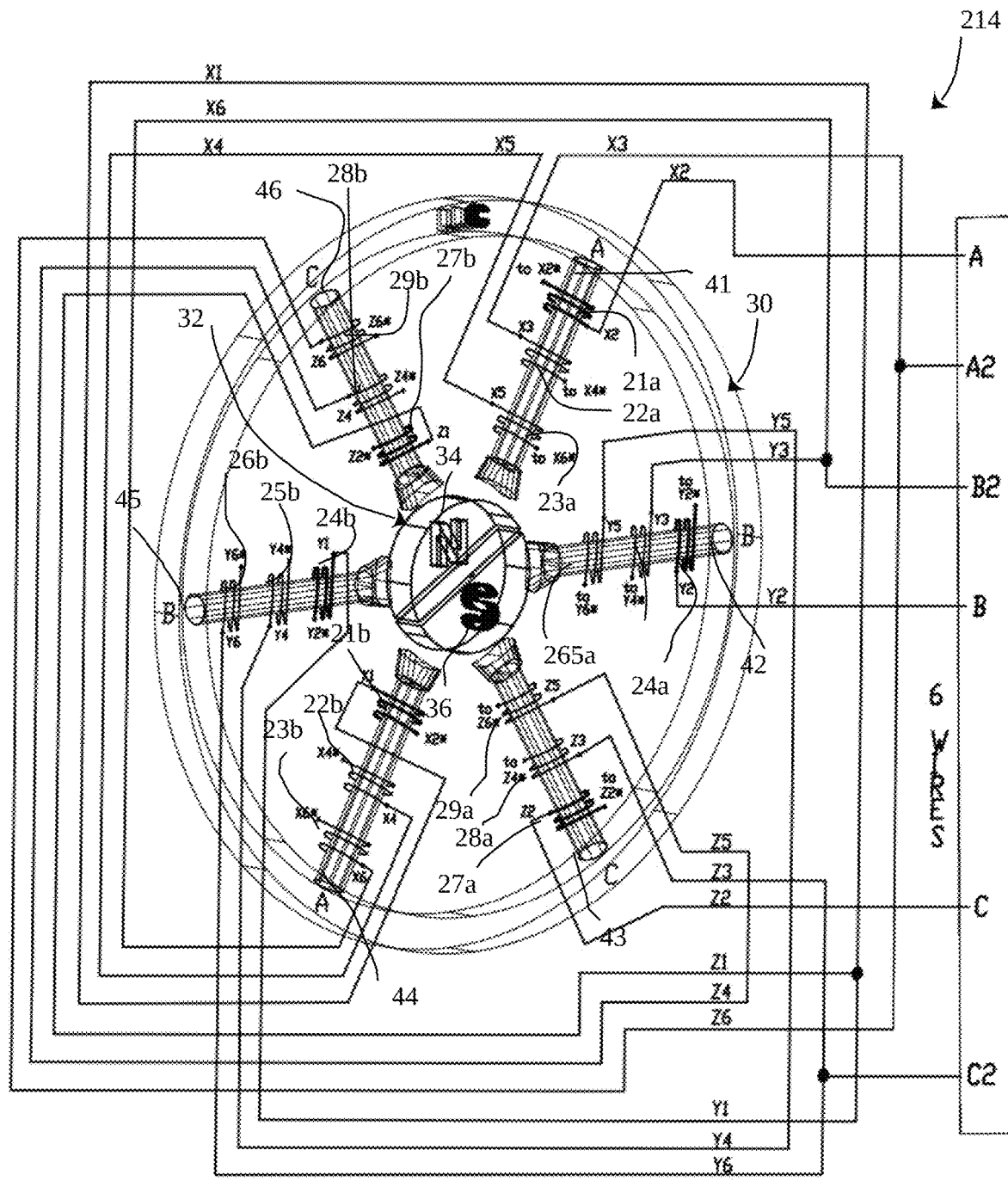
FIG. 12, in a schematic view, illustrates the wiring of one configuration example of the electric motor of FIG. 11.

As seen from FIG. 12, the physical structure of the motor module 214 is similar to that of the motor module 14 except for 2 major differences. The first difference is due to the fact that the wye and delta configurations now have distinct input nodes, instead of sharing one in the motor 10. Therefore, input node B is now connected only to coil 24a, and the new input node $B_2$ is connected to coils 25a and 23b. Also, connection to the coils 21a, 21b, 24a, 24b, 27a and 27b forming the wye configuration is made in an inverse direction when compared to the motor 10. This is because current will be fed to these coils 21a, 21b, 24a, 24b, 27a and 27b in a reverse direction compared to the motor 10. Switching the connections to opposite ends of the coils 21a, 21b, 24a, 24b, 27a and 27b has for effect to realign the produced magnetic field with that produced by the delta configuration. This reversal of current feed direction is advantageous as it simplifies the architecture of the power management module 212 compared to what it would have to be otherwise.

Returning to FIG. 11, in addition to the components mentioned hereinabove, the power management module 212 includes a recovery circuit module 215, and eighteen switches S1 to S6, S8, S9, SA, SB, SC, SA2, SB2, SC2, SA2A, SC3, SB2B and SC2C. The power management module 212 also defines first and second terminals TT1 and TT2. The switches S1 to S6, S8, S9, SA, SB, SC, SA2, SB2, SC2, SA2A, SC3, SB2B and SC2C are selectively openable and closable so that the coil equivalents 21 to 29 are operable in a power mode and in a recovery move, as in the above-described devices. Typically, for each coil equivalent 21 to 29, the power mode is followed by the recovery mode, and the coil equivalent 21 to 29 is further operable in a passive mode wherein there is an absence of energy transfer between the given coil and the power output terminals PP1 and PP2.

In a specific embodiment of the invention, the recovery circuit module 215 is similar to the recovery circuit module 115 and acts as a rectifying circuit and extends between the six input nodes A, B, C, $A_2$, $B_2$ and $C_2$ and the first and second input terminals PP1 and PP2 without any intervening switch. The recovery circuit module 215 includes six pairs of diodes 120 instead of five in the recovery circuit module 115, but the configuration and functionality of these diodes 120 is similar to those of the diodes 120 in the recovery circuit module 115.

The capacitors C3 and C4 are respectively electrically connected to the first and second terminals TT1 and TT2 at their cathode. The capacitors C3 and C4 are also both electrically connected to the first power terminal PP1 at their anode, diode D1 extending between the first power terminal PP1 and the capacitor C3, and diode D2 extending between the first power terminal PP1 and the capacitor C4, so that current can only flow from the first power terminal PP1 to the capacitors C3 and C4 through the diodes D1 and D2. Switches S6 and S5 are provided respectively between the first power terminal PP1 and the anode of capacitors C3 and C4 to allow selective bypassing of the diodes D1 and D2.

Switches S3 and S4 are provided, along with diodes D3 and D4, between the anodes of the capacitors C3 and C4, and have a role similar to that of switches SW3 and SW4 and diodes D3 and D4 in the motor 10. In addition, switches S1 and S2 are provided respectively between the anodes of capacitors C3 and C4 and terminals TT2 and TT1, and have a role similar to that of switches SW1 and SW2 in the motor 10. Switches S8 and S9 extend between the second power input terminal PP2 and respectively the first and second terminals TT1 and TT2.

Switches SA, SB, SB2 and SC2 extend between the second terminal TT2 and respectively input nodes A, B, $B_2$ and $C_2$, and switches SA2, SC and SC3 extend between the first terminal TT1 and respectively input nodes $A_2$, C and $C_2$. In addition, switches SA2A, SB2B and SC2C allow shorting together respectively input nodes A and $A_2$, input nodes B and $B_2$, and input nodes C and $C_2$. These switches SA2A, SB2B and SC2C are used to connect in series some of the coils 21a to 29b of the delta configurations with some of the coils 21a to 29b of the wye configuration, so that current flows both through the delta and wye configuration.

The reader skilled in the art will understand the exact number and configuration of the various components of the power management module 212 may vary according to the exact embodiment of the invention without departing from the scope of the claims. The switches S1 to S6, S8, S9, SA, SB, SC, SA2, SB2, SC2, SA2A, SC3, SB2B and SC2C are typically high speed electronic power switches allowing to rapidly switch between open and closed states and to carry in the closed state relatively large currents. The capacitors C3 and C4 could be individual physical capacitors, or banks of such physical capacitors, or supercapacitors. The capacitors C3 and C4 can be charged and discharged relatively rapidly under relatively large tensions to receive and release electric energy in the form of charges stored on metal components separated from each other by a dielectric material. This is to be contrasted to batteries, which use electrochemical reactions to store energy.

The motor 200 may be controlled by the controller 48 (not shown in FIG. 11), or a similar controller. The structure of controllers 48 usable to control the motor 10 and the motor 200 may be similar to each other, but typically execute different software. When the motor 200 is controlled, the reference number 50 of FIG. 4 represents switches S1 to S6, S8, S9, SA, SB, SC, SA2, SB2, SC2, SA2A, SC3, SB2B and SC2C. The motor 200 may also be provided with the position sensor 52 for sensing a position of the rotor 32 relative to the stator 30 and feeding this information to the controller 48 to time the power phases for the coils 21a to 29b. In some embodiments, the position sensor 52 is also used to sense a rotation speed of the rotor 32 relative to the stator 30. However, in alternative embodiments, the rotation speed is detected using a dedicated speed sensor 54.

Figure 13:
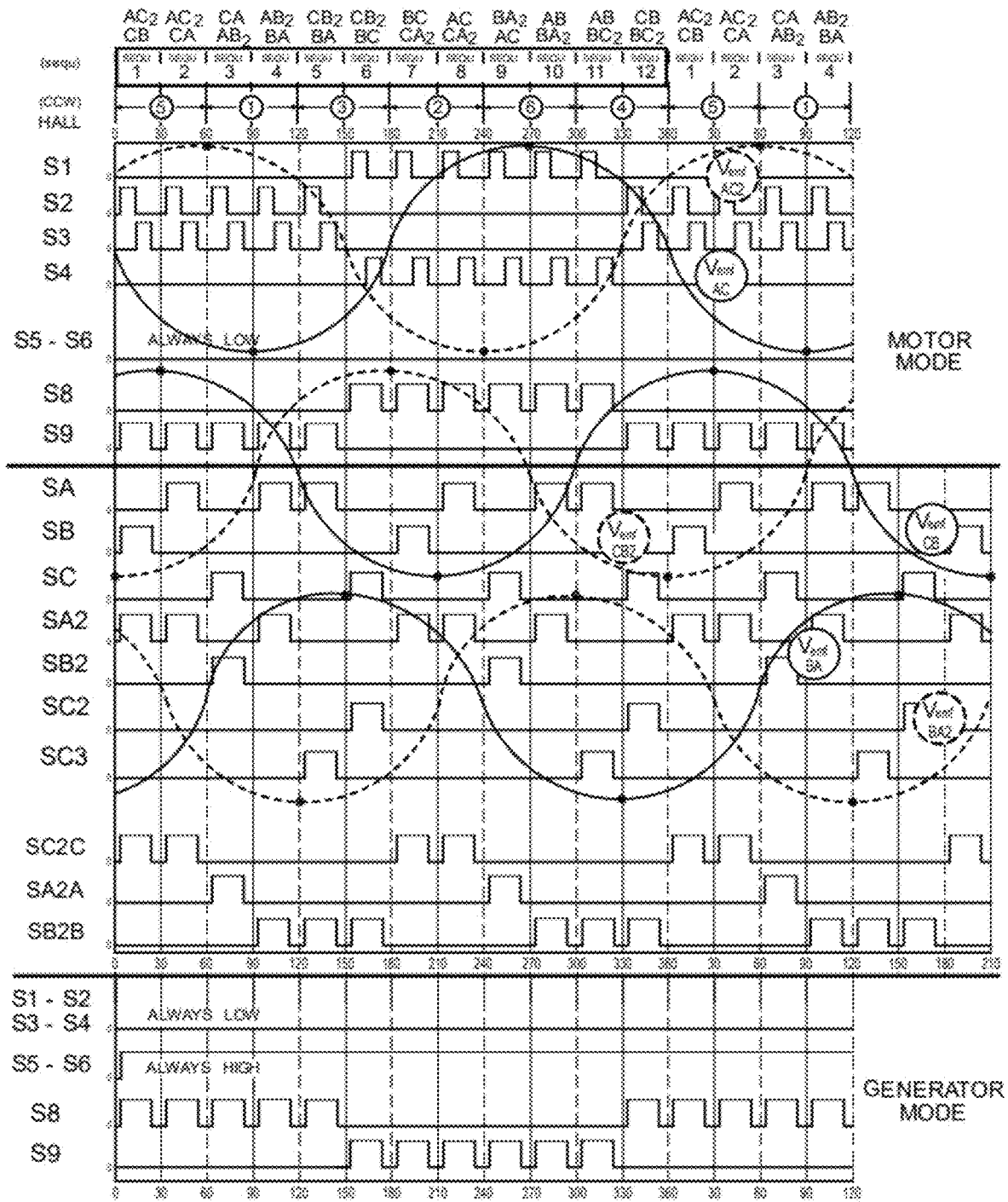
FIG. 13, in a schematic view, illustrates a timing diagram in a method of operation of the electric motor of FIG. 11.

Operation of the motor 200 in motor mode is now described with respect to FIG. 13. Operation in the generator mode is covered below. The state of the motor 200 changes 3 times within a range of 30 degrees of rotation of the rotor 32, between the three phases of the motor 200 (power, recovery, and passive). Each coil equivalent 21 to 29 goes successively through a power phase, in which a voltage is induced thereacross to cause rotation of the rotor 32, followed by a recovery phase, in which at least part of the energy stored in the magnetic field of the coil equivalents 21 to 29 during the power phase is provided to the first and second output terminals GP1 and GP2 through the recovery circuit module 115, and then a passive phase, in which the coil equivalent 21 to 29 don't transfer energy to the first and second output terminals GP1 and GP2. In some embodiments, the passive phase may be relatively short in some regimes of operation, simply to avoid short-circuits due to non-instantaneous switching of the switches. Also, a short passive phase my be provided between the powered and recovery phases. The power, recovery and passive phases correspond respectively to power, recovery and passive modes of operation of the coils 21a to 29b. Switches S5 and S6 are open when the motor 200 is used as a motor and are closed when the motor 200 is used as a generator. As in the other devices described hereinabove, in the power mode, the capacitor C3 or C4 that is in parallel with the first and second power input terminals PP1 and PP2 can act as a pump to increase the tension produced across the other capacitor C3 or C4, which promotes a faster increase in the current passing through the relevant coil equivalents 21 to 29 if residual charges are still present in this capacitor C3 or C4. These residual charges have been introduced in this capacitor C3 or C4 in previous phases of operation of the motor 200.

FIG. 13 and Table 5 below use the following convention for the six phases of the wye configuration: BC (30°), AC (90°), AB (150°), CB (210°), CA (270°), and BA (330°), and the following convention for the six phases of the delta configuration BC2 (0°), AC2 (60°), AB2 (120°), CB2 (180°), CA2 (240°), et BA2 (300°). One notes that the wye and delta configurations are offset by 30 degrees relative to each other. This is due to the fact that in the wye configurations, coils 21a to 29b having two different angular orientation on the stator 30 are excited, while coils at a single angular orientation on the stator 30 are excited in the delta configuration. The orientation in this document relates to an angular position and its 180 degrees matching opposed angular position, which is also always excited due to the way the motor 200 is wired.

FIG. 13 is a timing diagram illustrating the state of each switch S1 to S6, S8, S9, SA, SB, SC, SA2, SB2, SC2, SA2A, SC3, SB2B and SC2C during operation of the motor 200. This timing diagram is periodic with each rotation of the motor 200. A high state denotes a closed switch S1 to S6, S8, S9, SA, SB, SC, SA2, SB2, SC2, SA2A, SC3, SB2B and SC2C, allowing electrical connection thereacross. A low state denotes an open switch S1 to S6, S8, S9, SA, SB, SC, SA2, SB2, SC2, SA2A, SC3, SB2B and SC2C in which no current flows through the switch S1 to S6, S8, S9, SA, SB, SC, SA2, SB2, SC2, SA2A, SC3, SB2B and SC2C. The undulating sinusoidal continuous and dashed lines illustrate the 3 phases of the delta configuration (dashed line) and of the wye configuration (continuous line). The phase to which a 30 degrees block relates is denoted at the top of the diagram for each 30 degrees block, and the horizontal axis corresponds to the angular position of the rotor 32 with respect to an origin. Theoretical calculations or empirical results may be used to get the correct position at which the power mode should be activated to produce an optimal energy recovery from the mechanical torque applied to the rotor 32. Table 5 includes the sequence of operation of the some of the switches S1 to S6, S8, S9, SA, SB, SC, SA2, SB2, SC2, SA2A, SC3, SB2B and SC2C in a different form. It should be noted that in some embodiments, the switches S1 to S6, S8, S9, SA, SB, SC, SA2, SB2, SC2, SA2A, SC3, SB2B and SC2C may be closed for a variable duration, depending on the mechanical and electrical properties of the motor 200.

An example of one power/recovery cycle is now described, with the understanding that the other corresponding cycles are similar and follow the sequence of FIG. 13 and Table 4. In this example, the power phase and recovery phase of coil equivalents 24, 27, 28 and 29 is described. Initially, it is presumed that all the switches S1 to S6, S8, S9, SA, SB, SC, SA2, SB2, SC2, SA2A, SC3, SB2B and SC2C are open. Then, in the power phase, switches SA2, SB, SC2C, S9 and S2 are closed simultaneously, which creates a closed circuit for phase AC2 of the delta configuration and phase CB of the wye configuration. If one follows the current in this configuration, one sees that the current will leave the battery 16 and/or the capacitor C4, depending on their relative voltage, flow through switch S2, enter the motor module 214 at input node $A_2$, leave the motor module at input node $C_2$, flow through switch SC2C, enter the motor module 214 at input node C, leave the motor module at input node B, and return to the battery 16 and/or the capacitor C4.

Once the power phase is completed, for example once peak current is achieved in the coil equivalents 24, 27, 28 and 29, the recovery phase is achieved by opening switch S2 and closing switch S3. In this phase, the magnetic energy stored in the coil equivalents 24, 27, 28 and 29 is used to add charge to capacitor C3. As in the motor 10, capacitor C4 acts as a pump to assist in this energy recovery. Once this energy recovery is completed, just before activation of the next phase, all switches S1 to S6, S8, S9, SA, SB, SC, SA2, SB2, SC2, SA2A, SC3, SB2B and SC2C are open again. In the motor 200, each capacitor C3 or C4 is charged during six successive phases of operation, and the other capacitor C3 or C4 is then charged in the next six phases.

TABLE 5

Sequence of operation of the motor 200 in motor mode showing the various phases of operation

| PHASE | S1 | S2 | S3 | S4 | S8 | S9 | SA | SB | SC | SA2 | SB2 | SC2 | SC3 | SC2C | SA2A | SB2B |
|---|---|---|---|---|---|---|---|---|---|---|---|---|---|---|---|---|
| P1-AC2-CB | O | C | O | O | O | C | O | C | O | C | O | O | O | C | O | O |
| R1-AC2-CB | O | O | C | O | O | C | O | C | O | C | O | O | O | C | O | O |
| P2-AC2-CA | O | C | O | O | O | C | C | O | O | C | O | O | O | C | O | O |
| R2-AC2-CA | O | O | C | O | O | C | C | O | O | C | O | O | O | C | O | O |
| P3-CA-AB2 | O | C | O | O | O | C | O | O | C | O | C | O | O | O | C | O |
| R3-CA-AB2 | O | O | C | O | O | C | O | O | C | O | C | O | O | O | C | O |
| P4-AB2-BA | O | C | O | O | O | C | C | O | O | C | O | O | O | O | O | C |
| R4-AB2-BA | O | O | C | O | O | C | C | O | O | C | O | O | O | O | O | C |
| P5-CB2-BA | O | C | O | O | O | C | C | O | O | O | O | O | C | O | O | C |
| R5-CB2-BA | O | O | C | O | O | C | C | O | O | O | O | O | C | O | O | C |
| P6-CB2-BC | C | O | O | O | C | O | O | O | C | O | O | C | O | O | O | C |

TABLE 5-continued

Sequence of operation of the motor 200 in motor mode showing the various phases of operation

| PHASE | S1 | S2 | S3 | S4 | S8 | S9 | SA | SB | SC | SA2 | SB2 | SC2 | SC3 | SC2C | SA2A | SB2B |
|---|---|---|---|---|---|---|---|---|---|---|---|---|---|---|---|---|
| R6-CB2-BC | O | O | O | C | C | O | O | O | C | O | O | C | O | O | O | C |
| P7-BC-CA2 | C | O | O | O | C | O | O | C | O | C | O | O | O | C | O | O |
| R7-BC-CA2 | O | O | O | C | C | O | O | C | O | C | O | O | O | C | O | O |
| P8-AC-CA2 | C | O | O | O | C | O | C | O | O | C | O | O | O | C | O | O |
| R8-AC-CA2 | O | O | O | C | C | O | C | O | O | C | O | O | O | C | O | O |
| P9-BA2-AC | C | O | O | O | C | O | O | O | C | O | C | O | O | O | C | O |
| R9-BA2-AC | O | O | O | C | C | O | O | O | C | O | C | O | O | O | C | O |
| P10-AB-BA2 | C | O | O | O | C | O | C | O | O | C | O | O | O | O | O | C |
| R10-AB-BA2 | O | O | O | C | C | O | C | O | O | C | O | O | O | O | O | C |
| P11-AB-BC2 | C | O | O | O | C | O | C | O | O | O | O | O | C | O | O | C |
| R11-AB-BC2 | O | O | O | C | C | O | C | O | O | O | O | O | C | O | O | C |
| P12-CB-BC2 | O | C | O | O | O | C | O | O | C | O | O | C | O | O | O | C |
| R12-CB-BC2 | O | O | C | O | O | C | O | O | C | O | O | C | O | O | O | C |

P: Power mode. R: Recovery mode. O: Open switch. C: Closed switch. Switches S5 and S6 are always open When operated in generator mode, the motor 200 operates similarly to the generators described above, with the difference that the wye and delta configurations are both simultaneously activated, and no detailed description of this mode of operation is provided, as the flow of energy in the motor 200 is then similar to the flow of energy in the generators 100 and 100' with changes brought by the different wiring of the motor module 214. The switches SA to SB2B are open and closed as stated in Table 5 for each phase of operation. In addition, switches S1 to S4 are always open and switches S5 to S6 are always closed. Switches S8 and S9 are in a state opposed to the states mentioned in Table 5 for each phase.

Figure 14:
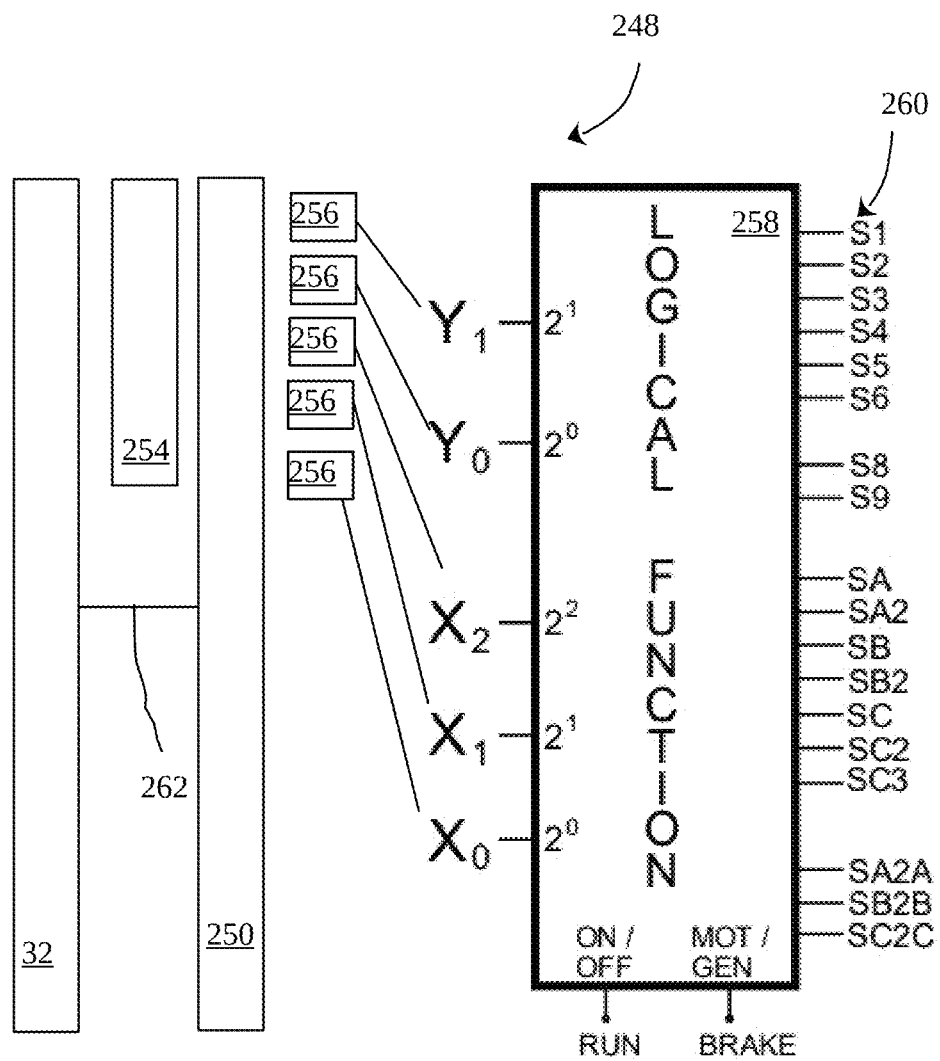
FIG. 14, in a schematic view, illustrates a controller usable to control the electric motor of FIG. 11.

FIG. 14 illustrates schematically an alternative controller 248 usable to control the motor 200. In opposition to the controller 48, which may be programmed to vary the duration of each phase (power and recovery) of operation of the motor 200 according to speed and torque requirements, the controller 248 powers the coils 21a to 29b in a fixed sequence according to the angular position of the rotor 32. Each phase of operation therefore corresponds to fixed angular positions of the rotor 32.

The controller 248 includes an encoder 250 jointly rotatable with the rotor 32 and defining a plurality of windows 252 (seen for example in FIG. 15) extending therethrough, at least one light source 254 and a plurality of light sensors 256. The light source 254 and light sensors 256 may operate at any suitable wavelength, including for example and non-limitingly those of infrared and visible light. The at least one light source 254, light sensors 256 and encoder 250 are positioned with the encoder 250 sandwiched between the light sensors 256 and the light source 254 such that light from the at least one light source 254 reaches each of the light sensors 256 only when one of the windows 252 is in register with the light sensor.

A logic circuit 258 is provided for selectively closing and opening the plurality of switches S1 to S6, S8. S9, SA, SB, SC, SA2, SB2, SC2, SA2A, SC3, SB2B and SC2C, collectively referred to as switches 260. The logic circuit 258 is operatively coupled to the light sensors 256 for receiving illumination information from each light sensor 256 indicative of whether the light reaches the light sensor 256 or not. Also, the logic circuit 258 is operative for selectively closing and opening the switches 260 individually. The logic circuit 258 may include discrete logic gate components, be embodied in an integrated circuit, or include a combination of discrete logic gate components and integrated circuits.

Figures 15, 16:
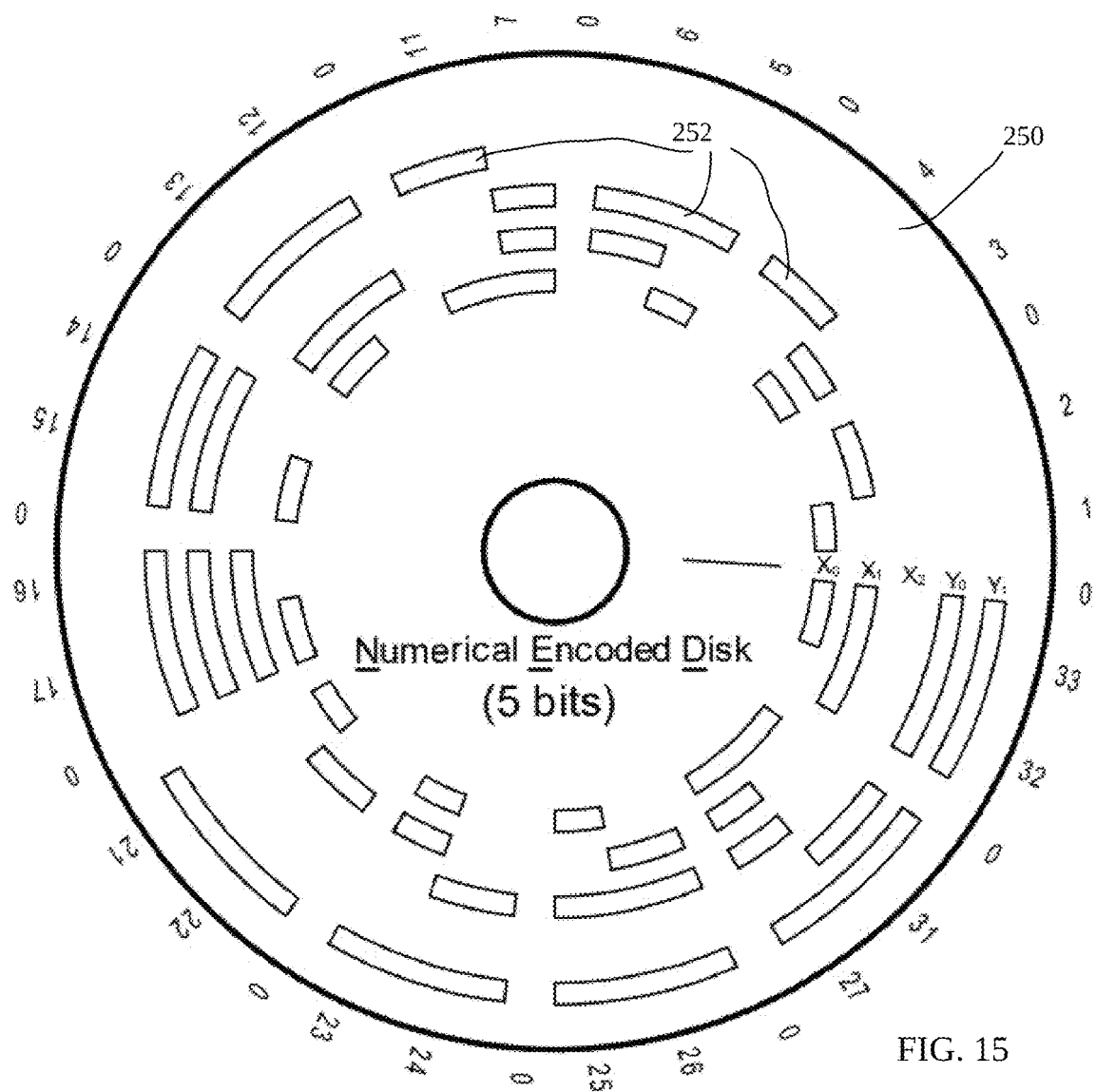
FIG. 15, in a plane top view, illustrates an encoder part of the controller of FIG. 14.
FIG. 16, in a schematic view, illustrates a code embodied in the encoder of FIG. 15.

Referring to FIG. 15, in a specific embodiment of the invention, the encoder 250 may take the form of a disk through which the windows 252 extend. The windows 252 may be formed by apertures extending through a thickness of the encoder 250, or may be formed by transparent portions of the encoder 250, the remainder of the encoder 250 being opaque to the light detected by the light sensors 252. Typically, the windows are substantially arcuate and centered on a rotation axis 262 of the encoder 250, which is typically along the rotation axis of the rotor 32 (seen in FIG. 14 for example). Therefore, each of the light sensors 254 is used to detect passage of light through windows 252 located at a respective radial distance from the center of the disk.

The windows 252 encodes in a binary code an open or closed status that each switch 260 is required to have at each angular position of the rotor 32 to switch the coils 21a to 29b between the powered, recovery and passive modes. The logic circuit 250 is operative for decoding the code and selectively controlling opening and closing each of the switches 260 so that the coils 21a to 29b exert a torque rotating the motor 200 when in the power mode and recovery of magnetic energy stored in the coils 21a to 29b is possible in the recovery mode. In addition, the logic circuit 250 may include a RUN input, turning on the electric motor when in a high state, and a BRAKE input, controlling whether the motor 200 is in a motor or generator mode. The motor 200 is by default in the motor mode, and enters the generator mode when the brake input is put in a high state.

Figure 17:
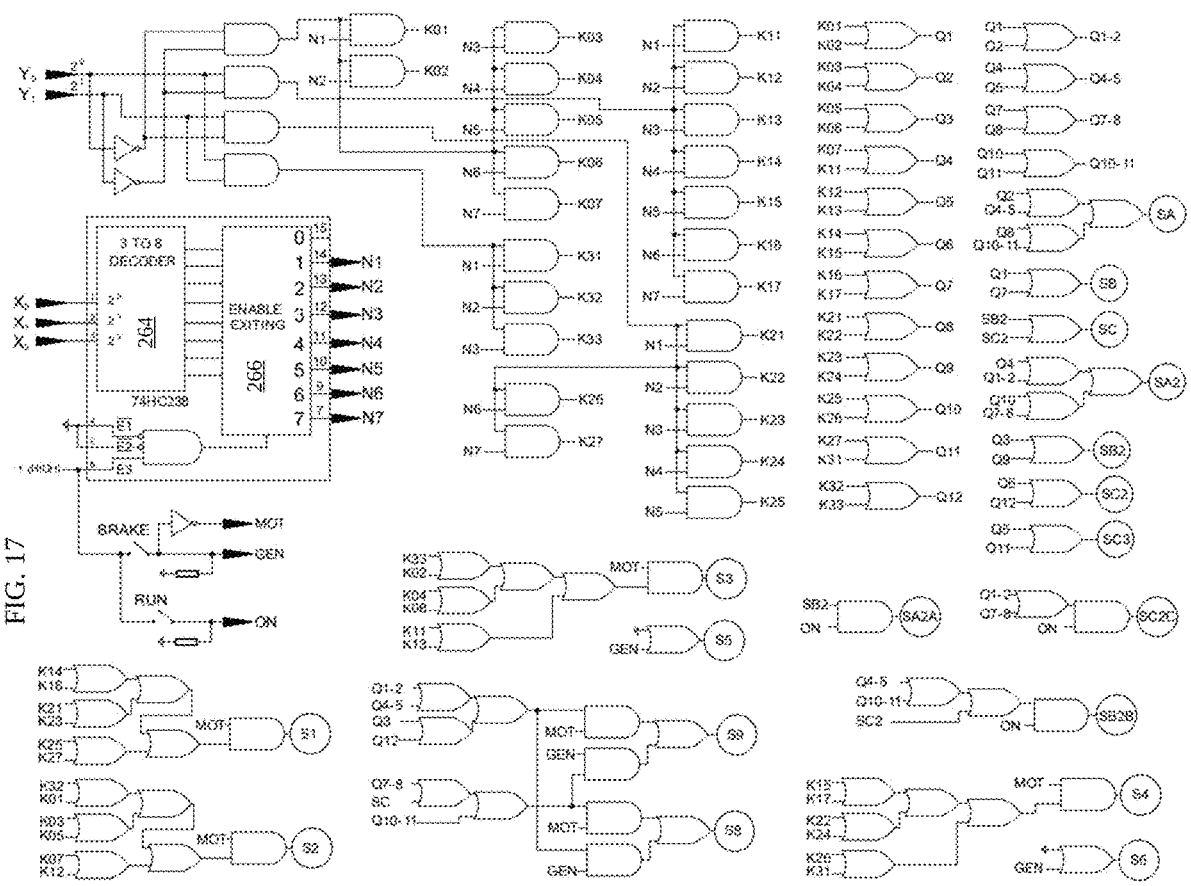
FIG. 17, in a schematic view, illustrates an example of an embodiment of a logic circuit part of the controller of FIG. 14.

For example, a five bit code is used to encode which switches 260 should be closed and open at each position of the rotor 32. Three of these bits X1, X2 and X3 are grouped together to form a first code X that may take 8 different values, and two other bits Y1 and Y2 are grouped together to form a second code Y that may take 4 different values. FIG. 16 presents the value of X and Y at each phase of operation, in the order power mode, recovery mode, and passive mode. FIG. 17 illustrates a logic circuit 258 using simple logic gates and a 3 to 8 decoder 264 coupled an 8 output "enable exiting" integrated circuit 266 able to peg to a high state a single one of its outputs corresponding to the value of X, with the other values remaining at a low state.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. An electric motor, comprising:
a rotor including a permanent magnet, the rotor defining a north pole and an opposed south pole;
a stator including a plurality of coils disposed circumferentially therearound, the plurality of coils including delta coils connected to each other in a delta configuration defining three edges and three vertices, and wye coils connected to each other in a wye configuration defining three branches each defining opposed proximal and distal ends, the proximal ends being substantially equipotentially electrically linked to each other, the coils within each edge being angularly superposed with each other and with the coils of a respective one of the branches at a common orientation along the stator;
a pair of power input terminals for receiving direct current (DC) electrical power;
a capacitor; and
a plurality of switches selectively openable and closable so that each coil is operable between a power mode and a recovery mode, wherein, in the power mode, the coil is electrically coupled to the power input terminals, the capacitor, or both the power input terminals and the capacitor to allow transfer of electric power to the coil from the power input terminals, the capacitor or both the power input terminals and the capacitor, and, in the recovery mode, the coil is electrically coupled to the capacitor to allow transfer of energy stored in the coil to the capacitor;
wherein in each of the powered and recovery modes, the coils from one of the edges and the coils of two of the branches are activated simultaneously.

2. The electric motor as defined in claim 1, wherein in each of the powered and recovery modes, the coils from one of the edges are connected in series with the coils of two of the branches so that the delta and wye configurations are both simultaneous active.

3. The electric motor as defined in claim 1, wherein each coil from the plurality of coils is electrically connected in series to another one of the coils from the plurality coils located diametrically opposed thereto on the stator and wound such that forces exerted on the north and south poles by the two coils are similar to each other.

4. The electric motor as defined in claim 1, wherein each coil is further operable in a passive mode wherein the coil is in an open circuit with both the capacitor and the power input terminals such that there is no transfer of energy into or out of the coil.

5. The electric motor as defined in claim 1, wherein, in the power mode, the coil is electrically coupled to both the power input terminals and the capacitor in parallel.

6. The electric motor as defined in claim 1, wherein the edges of the delta configuration have substantially similar edge inductances, and the branches of the wye configuration have substantially similar branch inductances.

7. The electric motor as defined in claim 6, wherein the edge inductances are about twice the branch inductances.

8. The electric motor as defined in claim 1, wherein the edges of the delta configuration are operated with three electrical delta phases offset by about 120 degrees relative to each other, the branches of the wye configuration are operated with three wye phases offset by about 120 degrees relative to each other, and the delta and wye phases are as a group offset by about 30 degrees relative to each other.

9. The electric motor as defined in claim 1, further comprising a position sensor for sensing a relative position between the rotor and the stator.

10. The electric motor as defined in claim 1, further comprising a speed sensor for sensing a relative rotation speed between the rotor and the stator.

11. The electric motor as defined in claim 1, wherein the switches from the plurality of switches are electronic switches, the electric motor further comprising a controller for selectively individually opening and closing the electronic switches.

12. The electric motor as defined in claim 11, wherein the controller is operative for modulating a duration of energy pulses provided to the coils during the power phase as a function of an external load applied to the electric motor.

13. The electric motor as defined in claim 11, wherein
each coil is further operable in a passive mode wherein the coil is in an open circuit with both the capacitor and the power input terminals such that there is no transfer of energy into or out of the coil;
the controller includes
an encoder jointly rotatable with the rotor and defining a plurality of windows extending therethrough, at least one light source and a plurality of light sensors provided with the encoder therebetween, wherein the at least one light source, light sensors and encoder are positioned such that light from the at least one light source reaches each of the light sensors only when one of the windows is in register therewith; and
a logic circuit for selectively closing and opening the plurality of switches, the logic circuit being operatively coupled to the light sensors for receiving illumination information from each light sensor indicative of whether the light reaches the sensor or not; and
the plurality of windows encodes in a binary code an open or closed status that each switch from the plurality of switches is required to have at each angular position of the rotor to switch the coils between the powered, recovery and passive modes, the logic circuit being operative for decoding the code and selectively controlling opening and closing each of the switches so that the coils exert a torque rotating the motor when in the power mode and recovery of magnetic energy stored in the coils is possible in the recovery mode.

14. The electric motor as defined in claim 13, wherein the encoder includes a disk through which the windows extend.

15. The electric motor as defined in claim 13, wherein the windows are substantially arcuate and centered on a rotation axis of the encoder.

16. The electric motor as defined in claim 1, further comprising a battery between the power input terminals.

17. The electric motor as defined in claim 1, wherein the electric motor is also operable as a generator in which the plurality of switches are selectively openable and closable so that each given coil is operable in a generator power mode and in a generator recovery mode, wherein
in the generator power mode, the given coil is in series in a power circuit between the power output terminals to allow creation of a voltage between the power output terminals due to an induced electromotive force created by an increase of magnetic flux in the given coil caused by rotation of the rotor, and
in the generator recovery mode, the given coil is in series in a recovery circuit distinct from the power circuit between the power output terminals to recover between the output terminal at least part of energy stored in the coil during operation in the power mode.

18. The electric motor as defined in claim 17, wherein the generator recovery circuit includes a rectifying circuit for preserving a polarity of the power output terminals so that DC power of a predetermined polarity is provided to the power output terminals by the recovery circuit.

19. An electric motor, comprising:
a rotor including a permanent magnet;
a stator including a plurality of coils disposed circumferentially therearound, the plurality of coils including delta coils connected to each other in a delta configuration and wye coils connected to each other in a wye configuration;
wherein the delta and wye coils are jointly operated using pulsed direct current so that some of the delta and some of the wye coils are fed simultaneously with the pulsed direct current;
further wherein the delta configuration defines three edges and three vertices, and the wye configuration defines three branches each defining opposed proximal and distal ends, the proximal ends being substantially equipotentially electrically linked to each other, the coils within each edge being angularly superposed with each other and with the coils of a respective one of the branches at a common orientation along the stator; and
further wherein the delta and we coils are jointly operated using the pulsed direct current so that some of the delta and some of the wye coils are in series with each other during each pulse of the pulsed direct current.

* * * * *